United States Patent
Ochiai

(10) Patent No.: US 11,039,057 B2
(45) Date of Patent: Jun. 15, 2021

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventor: Kei Ochiai, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/748,403

(22) Filed: Jan. 21, 2020

(65) Prior Publication Data

US 2020/0244894 A1 Jul. 30, 2020

(30) Foreign Application Priority Data

Jan. 30, 2019 (JP) .............................. JP2019-014424

(51) Int. Cl.
*H04N 5/232* (2006.01)

(52) U.S. Cl.
CPC .............................. *H04N 5/232122* (2018.08)

(58) Field of Classification Search
CPC ......... H04N 5/23212; H04N 5/232122; H04N 5/217; H04N 5/3745; H04N 5/378; H04N 5/37457; H04N 5/3742; H04N 5/3765; H01L 27/14609; H01L 27/14643
See application file for complete search history.

(56) References Cited

U.S. PATENT DOCUMENTS

| | | | |
|---|---|---|---|
| 10,015,430 B2 | 7/2018 | Kobayashi | |
| 10,321,075 B2 | 6/2019 | Kaneda | |
| 10,531,033 B2 | 1/2020 | Morita | |
| 2017/0332003 A1* | 11/2017 | Hamano | H04N 1/00 |
| 2018/0097960 A1 | 4/2018 | Ochiai | |
| 2018/0234618 A1* | 8/2018 | Kawarada | H04N 5/232122 |
| 2019/0058842 A1* | 2/2019 | Totsuka | H04N 5/3456 |

FOREIGN PATENT DOCUMENTS

JP 2000-258682 9/2000

* cited by examiner

*Primary Examiner* — Kelly L Jerabek
(74) *Attorney, Agent, or Firm* — Venable LLP

(57) ABSTRACT

A photoelectric conversion device includes a pixel region where pixels are arranged to form rows and columns, and a pixel control circuit that supplies control signals to the pixels. The pixel region includes first to fourth regions, a first pixel in the first region and a second pixel in the second region are arranged on different columns on a first row, a third pixel in the third region and a fourth pixel in the fourth region are arranged on different rows on a first column, and the first row on which the first and second pixels are arranged is arranged between rows on which the third and fourth pixels are arranged. The pixel control circuit simultaneously reads out pixel signals of the first and second pixels in a first period and simultaneously reads out pixel signals of the third and fourth pixels in a second period.

19 Claims, 14 Drawing Sheets

PHOTOELECTRIC CONVERSION DEVICE AND METHOD OF DRIVING PHOTOELECTRIC CONVERSION DEVICE

BACKGROUND OF THE INVENTION

Field of the Invention

The present invention relates to a photoelectric conversion device and a method of driving the photoelectric conversion device.

Description of the Related Art

A photoelectric conversion device in which a plurality of photoelectric conversion elements are two-dimensionally arranged is widely used as an imaging element of a digital camera or a sensing element for ranging, machine vision, or image recognition. To achieve high functionality, various readout methods are applied to photoelectric conversion devices. As one example, it has been proposed to utilize image data obtained from a pair of photoelectric conversion elements. Japanese Patent Application Laid-Open No. 2000-258682 discloses a solid-state imaging device that performs phase difference detection type autofocusing by using a correlation operation result of image data obtained from a pair of photoelectric conversion element groups provided in an area sensor.

When power supply voltage fluctuations or the like occur during a readout operation of image data from an area sensor, random stripe pattern noise may be superimposed on the image data. When image data obtained from a pair of photoelectric conversion element groups is utilized, accuracy of signal processing may be reduced when different amounts of noise are superimposed on respective data.

For example, a phase difference detection type autofocus sensor performs a correlation operation between two image data output from a reference part and a comparison part, calculates a phase shift amount, and measures a distance to an object by using the principle of triangulation. Therefore, when different pattern noise is superimposed on these two image data, correlation operation is inaccurate, and as a result, the accuracy of focusing in autofocusing may be reduced.

SUMMARY OF THE INVENTION

The present invention intends to provide a photoelectric conversion device and a method of driving the same that can suppress influence of pattern noise superimposed on paired image data.

According to one aspect of the present invention, provided is a photoelectric conversion device including a pixel region in which a plurality of pixels each including a photoelectric converter are arranged to form a plurality of rows and a plurality of columns, and a pixel control circuit that supplies control signals to the plurality of pixels, wherein the pixel region includes a first readout region, a second readout region, a third readout region, and a fourth readout region, wherein a first pixel in the first readout region and a second pixel in the second readout region are arranged on a first row and on different columns, wherein a third pixel in the third readout region and a fourth pixel in the fourth readout region are arranged on a first column and on different rows, wherein the first row on which the first pixel and the second pixel are arranged is arranged between a row on which the third pixel is arranged and a row on which the fourth pixel is arranged, and wherein the pixel control circuit performs an operation of simultaneously reading out a pixel signal of the first pixel and a pixel signal of the second pixel in a first period and performs an operation of simultaneously reading out a pixel signal of the third pixel and a pixel signal of the fourth pixel in a second period that is different from the first period.

Further, according to another aspect of the present invention, provided is a photoelectric conversion device including a pixel region in which a plurality of pixels each including a photoelectric converter are arranged to form a plurality of rows and a plurality of columns, a plurality of first control lines each connected to the pixels on a corresponding row such that at least any one of the plurality of first control lines is arranged on each of the plurality of rows, a plurality of second control lines each connected to the pixels on a corresponding column such that at least any one of the plurality of second control lines is arranged on each of the plurality of columns, a pixel control circuit connected to the plurality of first control lines and the plurality of second control lines and configured to supply control signals used for controlling the pixels to the plurality of first control lines and the plurality of second control lines, a plurality of first output lines each arranged on each of the plurality of columns and configured to output signals from the pixels on a corresponding column in accordance with the control signals supplied from the pixel control circuit via the first control lines, and a plurality of second output lines each arranged on each of the plurality of rows and configured to output signals from the pixels on a corresponding row in accordance with the control signals supplied from the pixel control circuit via the second control lines, wherein the pixel region includes a first readout region, a second readout region, a third readout region, and a fourth readout region, wherein a first pixel in the first readout region and a second pixel in the second readout region are arranged on a first row and on different columns, wherein a third pixel in the third readout region and a fourth pixel in the fourth readout region are arranged on a first column and on different rows, and wherein the first row on which the first pixel and the second pixel are arranged is arranged between a row on which the third pixel is arranged and a row on which the fourth pixel is arranged.

Further, according to yet another aspect of the present invention, provided is a method of driving a photoelectric converter are arranged to form a plurality of rows and a plurality of columns, wherein the pixel region includes a first readout region, a second readout region, a third readout region, and a fourth readout region, wherein a first pixel in the first readout region and a second pixel in the second readout region are arranged on a first row and on different columns, wherein a third pixel in the third readout region and a fourth pixel in the fourth readout region are arranged on a first column and on different rows, and wherein the first row on which the first pixel and the second pixel are arranged is arranged between a row on which the third pixel is arranged and a row on which the fourth pixel is arranged, the method including simultaneously reading out a pixel signal of the first pixel and a pixel signal of the second pixel in a first period; and simultaneously reading out a pixel signal of the third pixel and a pixel signal of the fourth pixel in a second period that is different from the first period.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
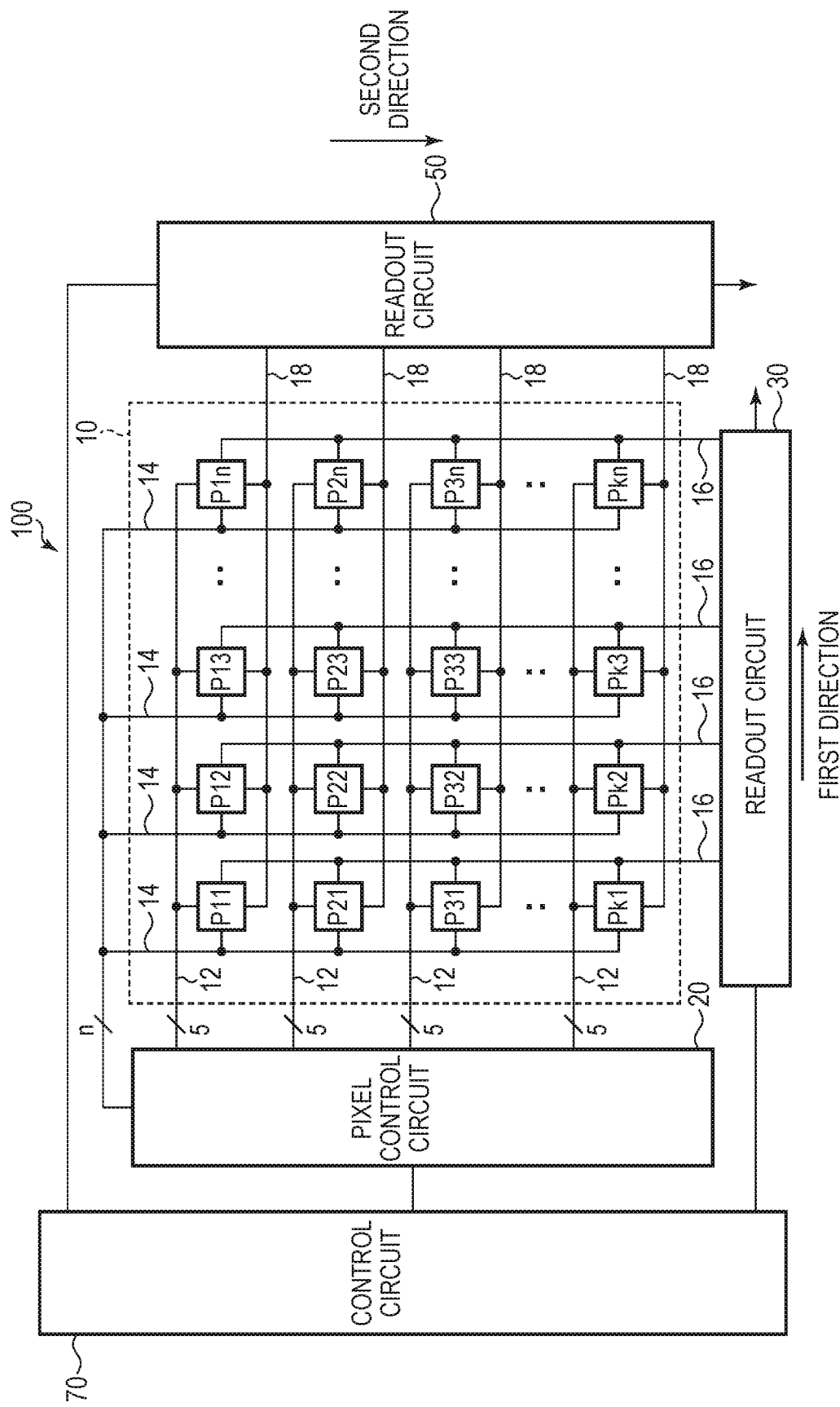
FIG. 1 is a diagram illustrating a general configuration of a photoelectric conversion device according to a first embodiment of the present invention.
Figure 2:
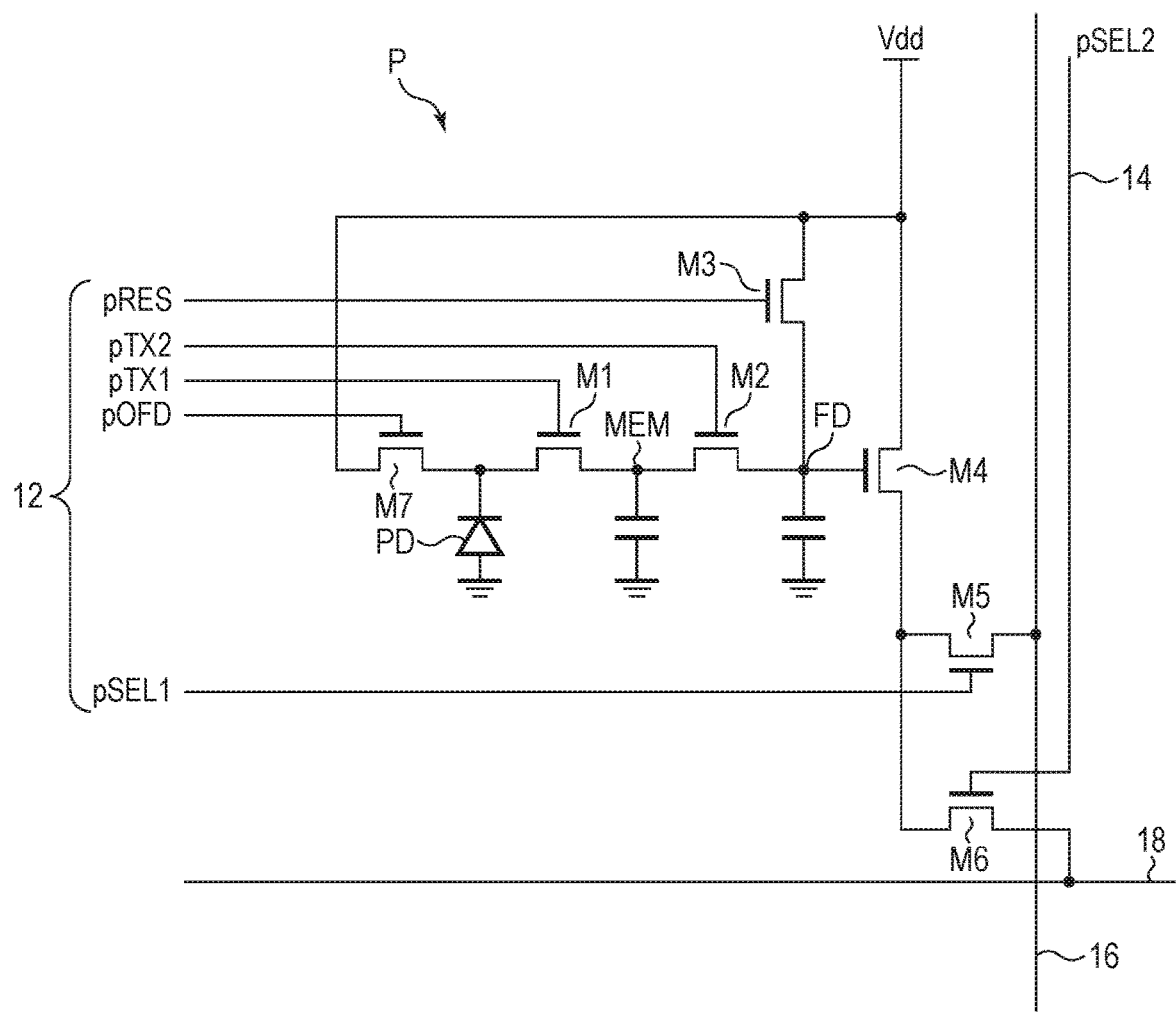
FIG. 2 is a circuit diagram illustrating a configuration example of a pixel of the photoelectric conversion device according to the first embodiment of the present invention.
Figure 3:
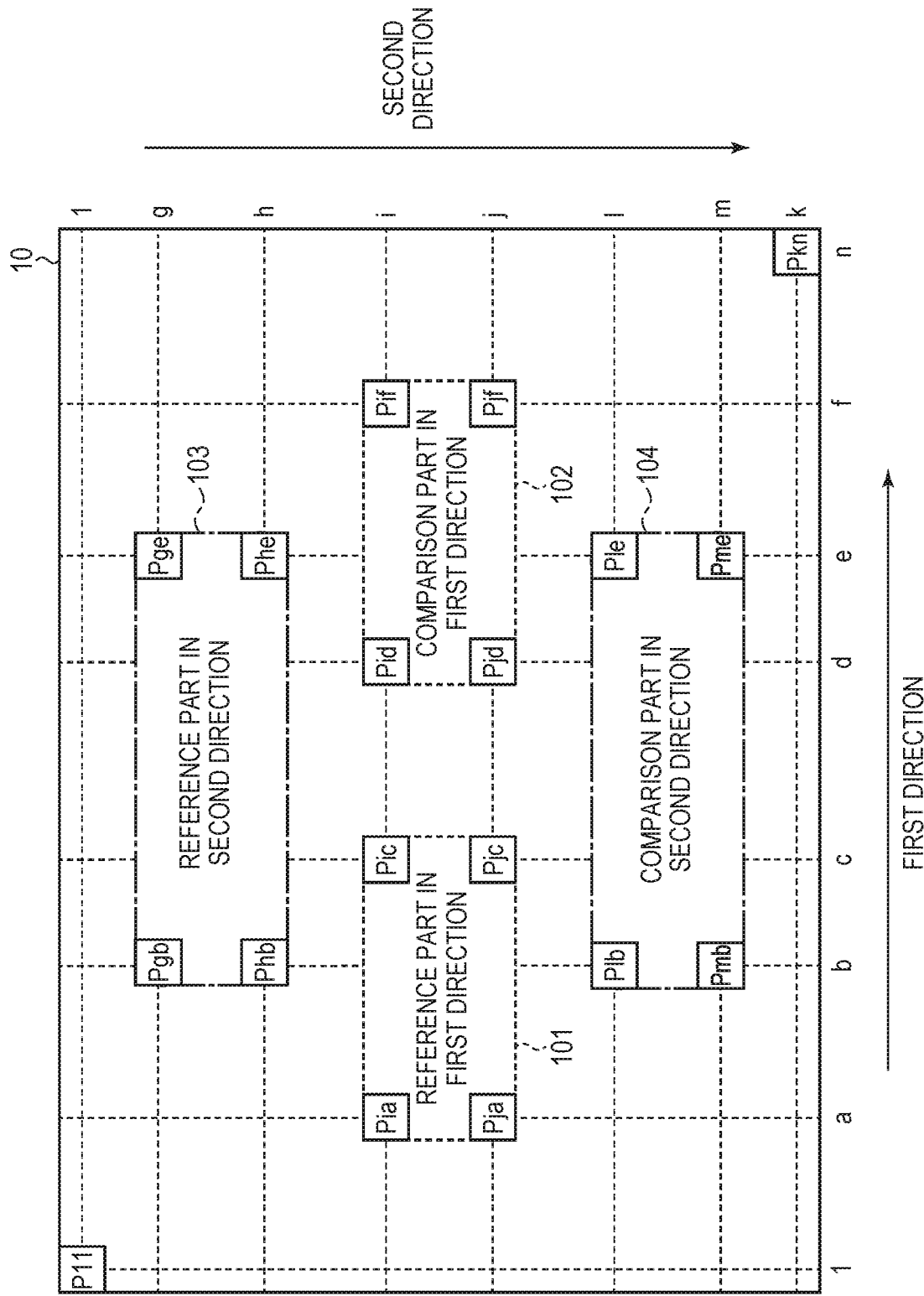
FIG. 3 is a diagram schematically illustrating a positional relationship between a reference part and a comparison part arranged in a pixel region of the photoelectric conversion device according to the first embodiment of the present invention.
Figure 4:
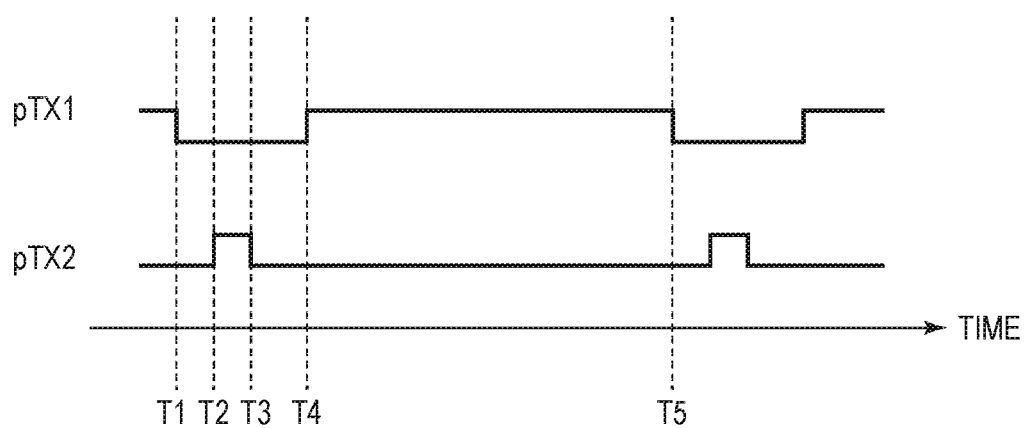
FIG. 4 and FIG. 5 are timing diagrams illustrating a method of driving the photoelectric conversion device according to the first embodiment of the present invention.
Figure 5:
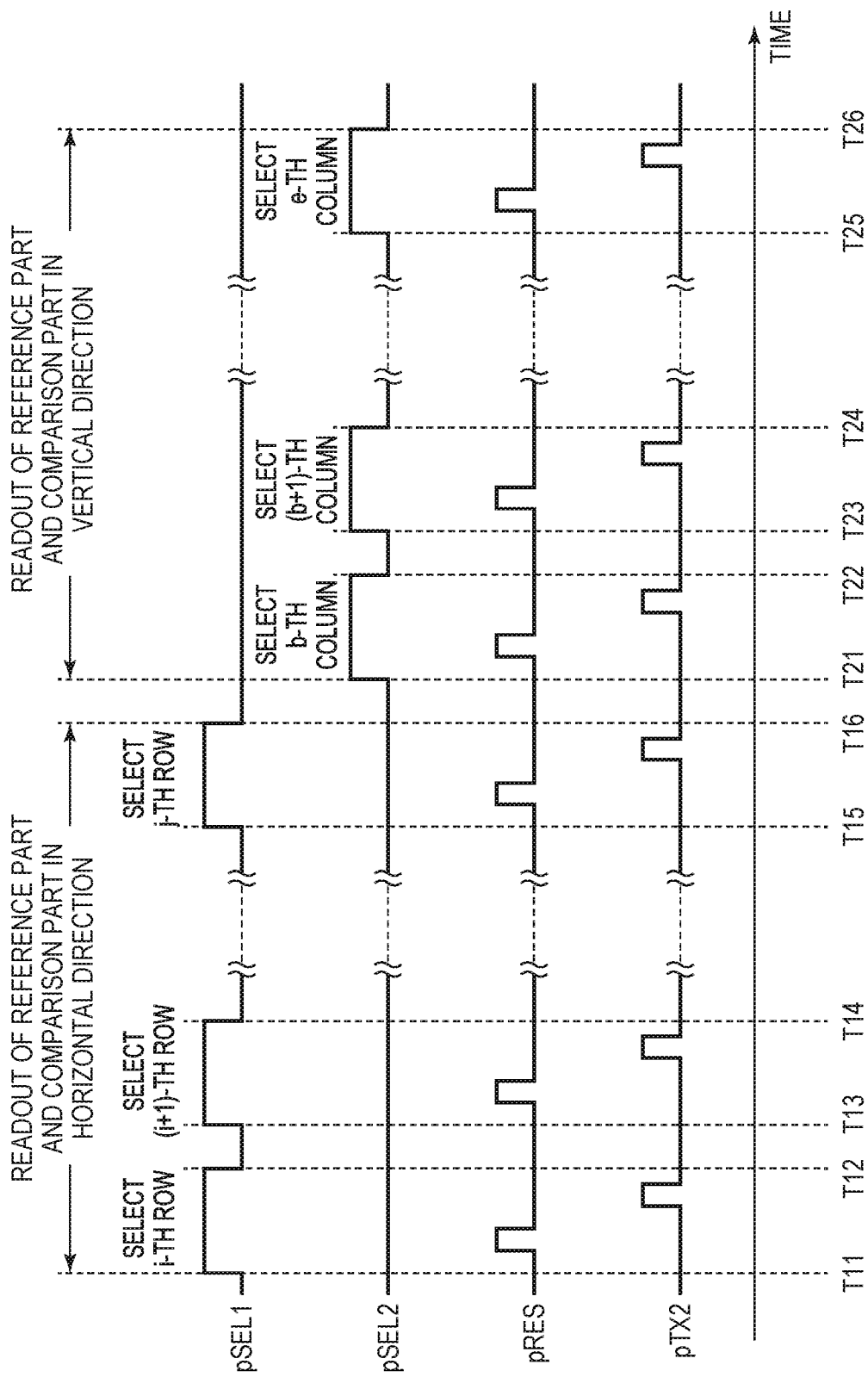

A photoelectric conversion device and a method of driving the same according to a first embodiment of the present invention will be described with reference to FIG. 1 to FIG. 5. FIG. 1 is a diagram illustrating a general configuration of the photoelectric conversion device according to the present embodiment. FIG. 2 is a circuit diagram illustrating a configuration example of a pixel of the photoelectric conversion device according to the present embodiment. FIG. 3 is a diagram schematically illustrating a positional relationship between a reference part and a comparison part arranged in a pixel region of the photoelectric conversion device according to the present embodiment. FIG. 4 and FIG. 5 are timing diagrams illustrating a method of driving the photoelectric conversion device according to the present embodiment.

First, a general configuration of the photoelectric conversion device according to the present embodiment will be described with reference to FIG. 1 to FIG. 3.

As illustrated in FIG. 1, the photoelectric conversion device according to the present embodiment includes a pixel region 10, a pixel control circuit 20, readout circuits 30 and 50, and a control circuit 70.

A plurality of pixels P arranged in a matrix over a plurality of rows and a plurality of columns are provided in the pixel region 10. Each of the pixels P includes a photoelectric converter that converts an incident light into charge in accordance with the light amount. In FIG. 1, each of the pixels is represented by a reference in which the row number and the column number are added to the reference "P". For example, a reference "P23" is applied to the pixel P arranged on the second row and the third column. Note that, while FIG. 1 illustrates a pixel array of k rows by n columns, the number of rows and the number of columns of the pixel array arranged in the pixel region 10 are not particularly limited.

On each row of the pixel array of the pixel region 10, a control line 12 and an output line 18 are arranged extending in a first direction (the lateral direction in FIG. 1). The control line 12 is connected to the pixels P aligned in the first direction to form a signal line common to these pixels P. Further, the output line 18 is connected to the pixels P aligned in the first direction to form a signal line common to these pixels P. Note that the first direction may be referred to as the row direction.

Further, on each column of the pixel array of the pixel region 10, a control line 14 and an output line 16 are arranged extending in a second direction intersecting the first direction (the longitudinal direction in FIG. 1). The control line 14 is connected to the pixels P aligned in the second direction to form a signal line common to these pixels P. Further, the output line 16 is connected to the pixels P aligned in the second direction to form a signal line common to these pixels P. Note that the second direction may be referred to as the column direction.

In the present embodiment, a plurality of control lines 14 are arranged in association with a plurality of columns. That is, each of the plurality of control lines 14 is connected to one corresponding column out of the plurality of columns. Further, a plurality of output lines 18 are arranged in association with a plurality of rows. That is, each of the plurality of output lines 18 is connected to one corresponding row out of the plurality of rows. As a modified example of the present embodiment, however, the plurality of control lines 14 may be arranged in association with the plurality of rows, and the plurality of output lines 18 may be arranged in association with the plurality of columns. In such a modified example, the plurality of control lines 12 may be arranged in association with the plurality of columns, and the plurality of output lines 16 may be arranged in association with the plurality of rows.

The control line 12 on each row and the control line 14 on each column are connected to the pixel control circuit 20. The pixel control circuit 20 is a pixel control unit that supplies, to the pixel P, control signals used for driving a readout circuit inside the pixel P via the control lines 12 and 14 when a signal is read out from the pixel P. The pixel control circuit 20 may be formed of a logic circuit such as a shift register, an address decoder, or the like. A signal read out from the pixel P is output to the output line 16 on the corresponding column or the output line 18 on the corresponding row in accordance with a drive mode of the readout circuit inside the pixel P.

Note that, for simplified illustration, FIG. 1 illustrates that n control lines 14 are connected to the pixel control circuit 20 by one bus wiring. Practically, in the same manner as the control line 12, each control line 14 transmits a control signal independently of the other control lines 14. Further, as described below, when one pixel P includes a plurality of objects to be controlled, the control line 12 arranged in association with one row in FIG. 1 may include a plurality of control lines. In the present embodiment, the control line 14 arranged in association with one column is formed of one control line. However, the control line 14 arranged in association with one corresponding column may include a plurality of control lines, if necessary.

The output line 16 on each column is connected to the readout circuit 30. Thereby, a signal output from the pixel P to the output line 16 is input to the readout circuit 30. Further, the output line 18 on each row is connected to the readout circuit 50. Thereby, a signal output from the pixel P to the output line 18 is input to the readout circuit 50.

The readout circuits 30 and 50 are circuit units that perform, on a signal read out from the pixel P, predetermined processing such as correlated double sampling (CDS) processing, amplification processing or signal processing such as analog-to-digital conversion, for example. Each of the readout circuits 30 and 50 may include a signal holding unit, a CDS circuit, a column amplifier, or the like. Each of the readout circuits 30 and 50 outputs a pixel signal on which predetermined processing has been performed to a signal processing unit (not illustrated) inside of the photoelectric conversion device 100 or outside of the photoelectric conversion device 100.

The control circuit 70 is a circuit unit used for supplying, to the pixel control circuit 20 and the readout circuits 30 and 50, control signals to control the operations or the timings described above. Note that some or all of the control signals supplied to the pixel control circuit 20 and the readout circuits 30 and 50 may be supplied from the outside of the photoelectric conversion device 100.

As illustrated in FIG. 2, each of the pixels P includes a photoelectric converter PD, transfer transistors M1 and M2, a reset transistor M3, an amplifier transistor M4, select transistors M5 and M6, and a charge drain transistor M7.

The photoelectric converter PD is a photodiode, for example. In the photodiode of the photoelectric converter PD, the anode is connected to the ground voltage node, and the cathode is connected to the source of the transfer transistor M1 and the source of the charge drain transistor M7. The drain of the transfer transistor M1 is connected to the source of the transfer transistor M2. A connection node between the drain of the transfer transistor M1 and the source of the transfer transistor M2 includes a capacitance component and forms a charge holding portion MEM due to this capacitance component. In FIG. 2, the capacitance component of the charge holding portion MEM is represented as a capacitor element connected to the node of interest.

The drain of the transfer transistor M2 is connected to the source of the reset transistor M3 and the gate of the amplifier transistor M4. A connection node of the drain of the transfer transistor M2, the source of the reset transistor M3, and the gate of the amplifier transistor M4 is a so-called floating diffusion portion FD. The floating diffusion portion FD includes capacitance component (floating diffusion capacitance) and forms a charge holding portion formed of the capacitance component. In FIG. 2, the capacitance component of the floating diffusion portion FD is represented as a capacitor element connected to an FD portion.

The drain of the reset transistor M3, the drain of the amplifier transistor M4, and the drain of the charge drain transistor M7 are connected to the power supply voltage node (voltage Vdd). Note that, with respect to a voltage supplied to the drain of the reset transistor M3, a voltage supplied to the drain of the amplifier transistor M4, and a voltage supplied to the drain of the charge drain transistor M7, any two or three of these voltages may be the same, or all of these voltages may be different from each other. The source of the amplifier transistor M4 is connected to the drain of the select transistor M5 and the drain of the select transistor M6. The source of the select transistor M5 is connected to the output line 16. The source of the select transistor M6 is connected to the output line 18.

Note that the names of the source and drain of the transistors may change in accordance with conductivity types, a function of interest, or the like of the transistors and may be referred by names opposite to the names of the source and drain described above.

In the pixel configuration of FIG. 2, the control line 12 arranged on each row of the pixel region 10 includes five signal lines that supply control signals pTX1, pTX2, pRES, pOFD, and pSEL1. The signal line that supplies the control signal pTX1 is respectively connected to the gates of the transfer transistors M1 of the pixels P belonging to the corresponding row and forms a signal line common to these pixels P. The signal line that supplies the control signal pTX2 is respectively connected to the gates of the transfer transistors M2 of the pixels P belonging to the corresponding row and forms a signal line common to these pixels P. The signal line that supplies the control signal pRES is respectively connected to the gates of the reset transistors M3 of the pixels P belonging to the corresponding row and forms a signal line common to these pixels P. The signal line that supplies the control signal pOFD is respectively connected to the gates of the charge drain transistors M7 of the pixels P belonging to the corresponding row and forms a signal line common to these pixels P. The signal line that supplies the control signal pESL1 is respectively connected to the gates of the select transistors M5 of the pixels P belonging to the corresponding row and forms a signal line common to these pixels P.

The control line 14 arranged on each column of the pixel region 10 includes a signal line that supplies a control signal pSEL2. The signal line that supplies the control signal pSEL2 is connected to the gates of the select transistors M6 of the pixels P belonging to the corresponding column and forms a signal line common to these pixels P. Independent control signals pSEL2 are supplied from the pixel control circuit 20 to each of the n signal lines arranged in association with respective columns.

When each transistor forming the pixel P is formed of an n-channel transistor, by being supplied with a control signal at a high level from the pixel control circuit 20, the corresponding transistor is turned on. Further, by being supplied with a control signal at a low level from the pixel control circuit 20, the corresponding transistor is turned off.

The output line 16 arranged on each column of the pixel region 10 is connected to the sources of the select transistors M5 of the pixels P belonging to the corresponding column. Further, the output line 18 arranged on each row of the pixel region 10 is connected to the sources of the select transistors M6 of the pixels P belonging to the corresponding row.

The photoelectric converter PD converts (photoelectrically converts) an incident light into an amount of charge in accordance with the light amount and accumulates generated charge. The transfer transistor M1 is controlled by the control signal pTX1 and, when turned on, transfers the charge held in the photoelectric converter PD to the charge holding portion MEM. The charge holding portion MEM holds the charge generated in the photoelectric converter PD in a portion different from the photoelectric converter PD.

The transfer transistor M2 is controlled by the control signal pTX2 and, when turned on, transfers charge held in the charge holding portion MEM to a floating diffusion portion FD. The floating diffusion portion FD holds the charge transferred from the charge holding portion MEM and sets the voltage, which is also an input node of an amplifier unit (the gate of the amplifier transistor M4), to a predetermined voltage in accordance with the capacitance value of the floating diffusion portion FD and the amount of transferred charge. The reset transistor M3 is controlled by the control signal pRES and, when turned on, resets the floating diffusion portion FD to a predetermined voltage in accordance with the voltage Vdd.

The select transistor M5 is controlled by the control signal pSEL1 and, when turned on, selects the pixel P which outputs a signal to the output line 16. Further, the select transistor M6 is controlled by the control signal pSEL2 and, when turned on, selects the pixel P which outputs a signal to the output line 18. In the amplifier transistor M4, the voltage Vdd is supplied to the drain, and a bias current is supplied from the current source (not illustrated) to the source via the select transistor M5 or the select transistor M6. Thereby, the amplifier transistor M4 forms an amplifier unit (a source follower circuit) having the gate as an input node. The amplifier transistor M4 outputs a signal based on charge generated by the incident light to the photoelectric converter PD to the output line 16 via the select transistor M5 or to the output line 18 via the select transistor M6.

The charge drain transistor M7 is controlled by the control signal pOFD and, when turned on, drains charge accumulated in the photoelectric converter PD to the power supply. That is, when turned on, the charge drain transistor M7 resets the photoelectric converter PD to a predetermined voltage in accordance with the voltage Vdd.

According to the pixel configuration illustrated in FIG. 2, charge generated in the photoelectric converter PD while the charge holding portion MEM is holding charge can be accumulated in the photoelectric converter PD. Thereby, a capturing operation in which the exposure periods between a plurality of pixels P are matched, namely, a so-called global electronic shutter operation can be performed. In such a case, by controlling the charge drain transistors M7 to be collectively turned off in all the pixels P to drain charges accumulated in the photoelectric converters PD at the same time, it is possible to control the start time of exposure in the global electronic shutter operation. Further, by controlling the transfer transistors M1 to be collectively turned on in all the pixels P to transfer charge accumulated in the photoelectric converters PD to the charge holding portions MEM at the same time, it is possible to control the end time of exposure in the global electronic shutter operation. Here, instead of exposure being started and ended at the same time in all the pixels P, exposure may be performed at the same time by only the pixels P in paired regions. Note that electronic shutter is an operation of electrically controlling accumulation of charge generated by an incident light.

As described above, the photoelectric conversion device according to the present embodiment is an area sensor including a plurality of pixels P arranged in a matrix inside the pixel region 10. In the present embodiment, an example in which a focus detection device used for performing autofocusing by phase difference detection is formed by using such an area sensor will be illustrated.

In a phase difference detection-type focus detection device, the pixel region 10 used for acquiring image data includes a reference part and a comparison part having an arbitrary size. Further, a correlation operation between image data output from the reference part and image data output from the comparison part is performed to calculate a phase shift amount therebetween, and a distance to an object is measured by using the principle of triangulation. The reference part and the comparison part are paired regions. Therefore, data output from the reference part and the comparison part is paired image data.

In the photoelectric conversion device according to the present embodiment, as illustrated in FIG. 3, two sets of a pair of the reference part and the comparison part are defined within the pixel region 10. That is, a reference part 101 and a comparison part 102 arranged in the first direction are defined as a first pair. Further, a reference part 103 and a comparison part 104 arranged in the second direction are defined as a second pair.

Each of the reference parts 101 and 103 and the comparison parts 102 and 104 is a readout region in which rows and columns are formed of a block including a plurality of consecutive pixels P. The reference part 101 and the comparison part 102 form a pair of focus detection regions used for detecting a phase difference along the first direction, and the reference part 103 and the comparison part 104 form a pair of focus detection regions used for detecting a phase difference along the second direction. The reason why two sets of the reference part and the comparison part are defined is to enable so-called cross distance measurement in which the focus position is detected both in the vertical direction and in the horizontal direction of an object. Each size of the reference parts 101 and 103 and the comparison parts 102 and 104 may be determined in accordance with the number of the pixels P forming these parts.

At least one pixel (a first pixel) out of pixels belonging to the reference part 101 (a first readout region) and at least one pixel (a second pixel) out of pixels belonging to the comparison part 102 (a second readout region) are arranged in the same row and in columns different from each other. At least one pixel (a third pixel) out of pixels belonging to the reference part 103 (a third readout region) and at least one pixel (a fourth pixel) out of pixels belonging to the comparison part 104 (a fourth readout region) are arranged in the same column and in rows different from each other. Further, the row to which the first pixel and the second pixel belong is arranged between the row to which the third pixel belongs and the row to which the fourth pixel belongs.

In the example of FIG. 1, the reference part 101 in the first direction is defined as a rectangular region including pixels Pia, Pic, Pja, and Pjc as vertices. The comparison part 102 in the first direction is defined as a rectangular region including pixels Pid, Pif, Pjd, and Pjf as vertices. The reference part 103 in the second direction is defined as a rectangular region including pixels Pgb, Pge, Phb, and Phe as vertices. The comparison part 104 in the second direction is defined as a rectangular region including pixels Plb, Ple, Pmb, and Pme as vertices. Here, a, b, c, d, e, and f are integers representing column numbers from 2 to n−1, and the values increase in this order. Further, g, h, i, j, l, and m are integers representing row numbers from 2 to k−1, and the values increase in this order.

Next, a method of driving the photoelectric conversion device according to the present embodiment will be described with reference to FIG. 4 and FIG. 5.

FIG. 4 is a timing diagram illustrating a shutter operation in the photoelectric conversion device of the present embodiment. The shutter operation is an operation that defines the start and the end of an exposure period in the photoelectric converter PD. In FIG. 4, the control signal pTX1 of the transfer transistor M1 and the control signal pTX2 of the transfer transistor M2 out of the control signals of the pixels P are illustrated. When each control signal is at a high level, the corresponding transistor is in an on-state. Further, when each control signal is at a low level, the corresponding transistor is in an off-state.

At time T1, the pixel control circuit 20 controls the control signal pTX1 supplied to the control line 12 on each row from the high level to the low level. Thereby, the transfer transistor M1 is turned off in all the pixels P.

In a period before time T1, exposure of the previous frame is performed in the photoelectric converter PD. Exposure means that charge generated by photoelectric conversion is accumulated or held as a signal. The charge generated before time T1 is held in the photoelectric converter PD. The end of the exposure of the previous frame is defined by the operation at time T1 in which the transfer transistors M1 that transfer charge from the photoelectric converters PD to the charge holding portions MEM are simultaneously controlled from an on-state to an off-state in all the pixels P.

Further, at time T1, all charge held in the photoelectric converter PD is transferred to the charge holding portion MEM. Thereby, the photoelectric converter PD enters an initial state and newly starts accumulating charge from time T1. As described above, in the present embodiment, in response to the transfer transistor M1 being turned off, charge accumulation in the photoelectric converter PD starts.

In the subsequent period from time T1 to time T4, the pixel control circuit 20 maintains the control signal pTX1 supplied to the control line 12 on each row at the low level. Thereby, the transfer transistor M1 is maintained in an off-state from time T1 to time T4, and charge generated in the photoelectric converter PD during this period is accumulated in the photoelectric converter PD.

In the period from time T2 to time T3 between time T1 and time T4, the pixel control circuit 20 controls the control signal pTX2 supplied to the control line 12 on each row from the low level to the high level. Thereby, the transfer transistor M2 is turned on, and charge held in the charge holding portion MEM at this time, that is, the charge generated in the exposure period of the previous frame is transferred from the charge holding portion MEM to the floating diffusion portion FD. As a result, the floating diffusion portion FD that is also the input node of the amplifier unit has a voltage in accordance with the capacitance value and the amount of the charge transferred from the charge holding portion MEM. In such a way, a signal based on the charge generated in the exposure period of the previous frame is output from the amplifier transistor M4 to the drain of the select transistor M5 and the drain of the select transistor M6.

At time T4, the pixel control circuit 20 controls the control signal pTX1 supplied to the control line 12 on each row from the low level to the high level. Thereby, the transfer transistors M1 are turned on in all the pixels P. Thereby, charge generated in the photoelectric converter PD in the period from time T1 to time T4 is transferred to the charge holding portion MEM. That is, after time T4, the charge generated in the period from time T1 to time T4 is held by the charge holding portion MEM.

Subsequently, in the period from time T4 to time T5 that is the time when the transfer transistor M1 is next turned off, the charge holding portion MEM holds both the charge generated in the period from time T1 to time T4 and the charge generated in the period from time T4 to time T5. Since the transfer transistor M1 is maintained in an on-state in the period from time T4 to time T5, the charge generated in the photoelectric converter PD in this period is immediately transferred to the charge holding portion MEM. Note that any period can be set for transferring charge from the photoelectric converter PD to the charge holding portion MEM.

Subsequently, at time T5, the pixel control circuit 20 controls the control signal pTX1 supplied to the control line 12 on each row from the high level to the low level. Thereby, the transfer transistors M1 are turned off in all the pixels P. Thereby, the exposure period for one frame ends.

In the drive method of the present embodiment, the exposure starts at time T1 and ends at time T5 in all the pixels P arranged in the pixel region 10. Further, the exposure of the subsequent frame starts from time T5, and the operation from time T1 to time T5 is then repeatedly performed.

Note that, while the end time of the one exposure period and the start time of the subsequent exposure period are defined as the same time by the operation of controlling the transfer transistors M1 from an on-state to an off-state in the drive example described above, which can be separately defined by using the charge drain transistor M7. In the period of time T1 to time T5, for example, the charge drain transistor M7 is controlled to be temporarily turned on. Thereby, a timing of controlling the charge drain transistor M7 from an on-state to an off-state can be defined as the start time of the subsequent exposure period. By using the charge drain transistor M7, it is possible to improve flexibility in setting of the length of the exposure period.

FIG. 5 is a timing diagram illustrating a readout operation in the photoelectric conversion device of the present embodiment. FIG. 5 illustrates the control signal pSEL1 of the select transistor M5, the control signal pSEL2 of the select transistor M6, the control signal pRES of the reset transistor M3, and the control signal pTX2 of the transfer transistor M2 out of the control signals of the pixel P. When each of these control signals is at a high level, the corresponding transistor is in an on-state. Further, when each of these control signals is at a low level, the corresponding transistor is in an off-state. Here, the first direction refers is referred to as the horizontal direction, and the second direction is referred to as the vertical direction.

Selection of the pixel P, reset of the floating diffusion portion FD, readout of a noise signal, transfer of charge, and readout of a light signal are performed in accordance with the control signals illustrated in FIG. 5, and image data is obtained by CDS circuits (not illustrated) provided in the readout circuits 30 and 50.

In a drive example described in the present embodiment, first, in a first period, readout of image data of the reference part 101 in the horizontal direction and readout of image data of the comparison part 102 in the horizontal direction are performed at the same time. Subsequently, in a second period that is different from the first period, readout of image data of the reference part 103 in the vertical direction and readout of image data of the comparison part 104 in the vertical direction are performed at the same time. In FIG. 5, the period from time T11 to time T16 is a period in which image data of the reference part 101 and image data of the comparison part 102 are read out, and the period from time T21 to time T26 is a period in which image data of the reference part 103 and image data of the comparison part 104 are read out. Note that, in the photoelectric conversion device according to the present embodiment, readout of image data of the reference part 101 in the horizontal direction, readout of image data of the comparison part 102 in the horizontal direction, readout of image data of the reference part 103 in the vertical direction, and readout of image data of the comparison part 104 in the vertical direction can also be performed at the same time.

The period from time T11 to time T12 is a period in which readout of signals from the pixels P belonging to the i-th row is performed. Note that the i-th row is the leading row of the reference part 101 and the comparison part 102, and the j-th row is the last row of the reference part 101 and the comparison part 102 (see FIG. 3).

During the period from time T11 to time T12, the pixel control circuit 20 controls the control signal pSEL1 supplied to the control line 12 on the i-th row to the high level. Thereby, the select transistors M5 of the pixels P belonging to the i-th row are turned on, and the pixels P belonging to the i-th row are selected. That is, the pixels P belonging to the i-th row are ready for outputting pixel signals to the readout circuit 30 via the output lines 16 on the corresponding columns.

A period in which the control signal pRES is at the high level out of the period from time T11 to time T12 of FIG. 5 is a reset period for the floating diffusion portion FD. Further, the period in which the control signal pTX2 is at the high level corresponds to the period from time T2 to time T3 of FIG. 4 and is a transfer period for charge from the charge holding portion MEM to the floating diffusion portion FD. A pixel signal read out to the output line 16 between the reset period and the transfer period is a signal (noise signal) in accordance with a reset voltage of the floating diffusion portion FD. Further, a pixel signal read out after the transfer period to the output line 16 is a signal (hereinafter called as "light signal") in accordance with the amount of charge generated in the photoelectric converter PD.

A noise signal and a light signal read out from the pixels P belonging to the i-th row to the readout circuit 30 are differentially processed in the CDS circuit provided in the readout circuit 30 to form image data on the i-th row.

Subsequently, in the same manner as the readout of image data from the pixels P belonging to the i-th row, readout of signals from the (i+1)-th row to the j-th row is repeated. FIG. 5 illustrates a case where readout of signals from the pixels P belonging to the (i+1)-th row is performed from time T13 to time T14 and readout of signals from the pixels P belonging to the j-th row is performed from time T15 to time T16, as an example.

In such a way, readout of pixel signals from all the pixels P belonging to the reference part 101 and the comparison part 102 arranged in the horizontal direction is performed to acquire image data of the reference part 101 and the comparison part 102.

Note that, since there is no pixel P forming the reference part 103 and the comparison part 104 from the i-th row to the j-th row on which the reference part 101 and the comparison part 102 are arranged, a readout operation on the reference part 101 and the comparison part 102 does not affect the pixels P of the reference part 103 and the comparison part 104.

The period from time T21 to time T22 is a period in which signals are read out from the pixels P belonging to the b-th column. Note that the b-th column is the leading column of the reference part 103 and the comparison part 104, and the e-th column is the last column of the reference part 103 and the comparison part 104 (see FIG. 3).

During the period from time T21 to time T22, the pixel control circuit 20 controls the control signal pSEL2 supplied to the control line 14 on the b-th column to the high level. Thereby, the select transistors M6 of the pixels P belonging to the b-th column are turned on, and the pixels P belonging to the b-th column are selected. That is, the pixels P belonging to the b-th column are ready for outputting pixel signals to the readout circuit 50 via the output lines 18 on the corresponding rows.

A period in which the control signal pRES is at the high level out of the period from time T21 to time T22 of FIG. 5 is a reset period for the floating diffusion portion FD. Further, the period in which the control signal pTX2 is at the high level corresponds to the period from time T2 to time T3 of FIG. 4 and is a transfer period for charge from the charge holding portion MEM to the floating diffusion portion FD. Pixel signals read out to the output lines 18 between the reset period and the transfer period are noise signals in accordance with a reset voltage of the floating diffusion portion FD. Further, pixel signals read out after the transfer period to the output lines 18 are light signals in accordance with the amount of charge generated in the photoelectric converter PD.

A noise signal and a light signal read out from the pixels P belonging to the b-th column to the readout circuit 50 are differentially processed in the CDS circuit provided in the readout circuit 50 to form image data on the b-th column.

Subsequently, in the same manner as the readout of image data from the pixels P belonging to the b-th column, readout of signals is repeatedly performed from the b+1-th column to the e-th column. FIG. 5 illustrates an example where readout of signals from the pixels P belonging to the b+1-th column is performed between time T23 and time T24 and readout of signals from the pixels P belonging to the e-th column is performed between time T25 and time T26.

In such a way, readout of pixel signals from all the pixels P belonging to the reference part 103 and the comparison part 104 arranged in the vertical direction is performed to acquire image data of the reference part 103 and image data of the comparison part 104.

In general, in a solid-state imaging device such as a CMOS image sensor, signals of a plurality of pixels arranged in a matrix are sequentially read out on a row basis to acquire the entire image data. In such driving, however, when noise that temporally varies such as such as fluctuations of a power supply voltage is mixed in the readout circuit at readout of image data, a noise component due to the noise is superimposed on the pixel signal, and this may cause data to vary. Since such data variation occurs on a row basis, this causes horizontal stripe pattern noise that occurs randomly to appear in image data read out from the solid-state imaging device.

When the readout operation described above is performed in the solid-state imaging device illustrated in FIG. 3, the pattern noise described above generated in the horizontal direction may be superimposed on the image data of the reference parts 101 and 103 and the comparison parts 102 and 104, respectively.

At this time, since the pattern noise described above is generated in the horizontal direction, the same amount of noise is superimposed on image data of the reference part 101 and image data of the comparison part 102 arranged in the horizontal direction. Therefore, when a correlation operation between the image data of the reference part 101 and the image data of the comparison part 102 is performed, noise components superimposed on the image data are cancelled and do not affect the result of the correlation operation.

However, since readout is performed at a different timing for the reference part 103 and the comparison part 104 arranged in the vertical direction, different amounts of noise may be superimposed on image data of the reference part 103 and image data of the comparison part 104. In such a case, the accuracy of a correlation operation between image data of the reference part 103 and image data of the comparison part 104 is reduced, and thereby the accuracy of focusing in autofocusing is reduced.

In this regard, the photoelectric conversion device of the present embodiment includes the readout circuit 30 connected to the output line 16 arranged in the vertical direction and the readout circuit 50 connected to the output line 18 arranged in the horizontal direction, as illustrated in FIG. 1. Therefore, with respect to the reference part 101 and the comparison part 102 arranged in the horizontal direction, readout of image data can be performed in parallel by using the readout circuit 30, and noise superimposed on image data of the reference part 101 and noise superimposed on image data of the comparison part 102 can be matched. Further, with respect to the reference part 103 and the comparison part 104 arranged in the vertical direction, readout of image data can be performed in parallel by using the readout circuit 50, and noise superimposed on image data of the reference part 103 and noise superimposed on image data of the comparison part 104 can be matched.

Therefore, according to the photoelectric conversion device of the present embodiment, accurate correlation operation can be performed on both the horizontal direction and the vertical direction, and the accuracy of focusing in autofocusing can be improved.

As described above, according to the present embodiment, influence of pattern noise superimposed on a pair of image data can be suppressed, and the accuracy of focusing in autofocusing can be improved.

Second Embodiment

Figure 6:
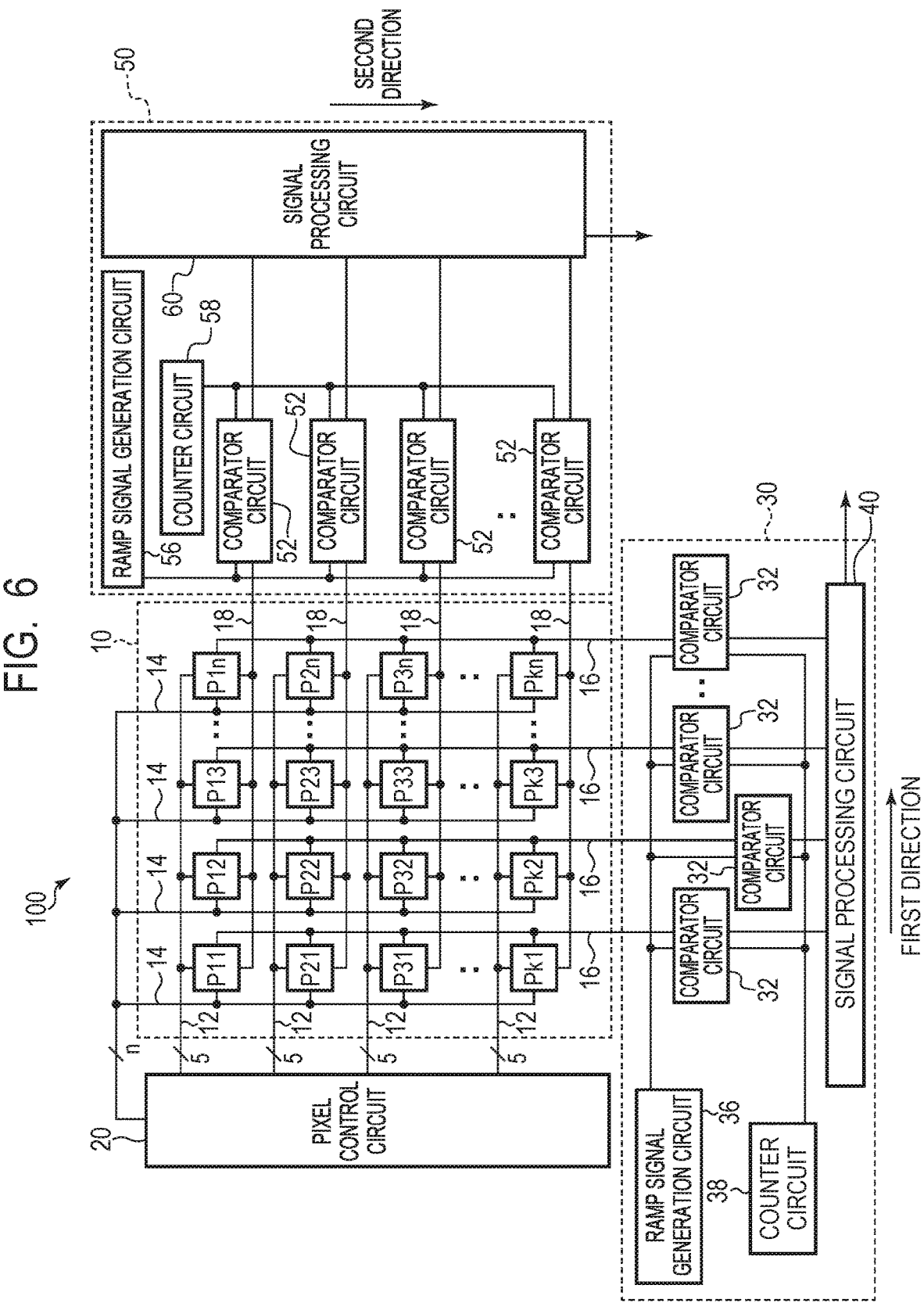
FIG. 6 is a diagram illustrating a general configuration of a photoelectric conversion device according to a second embodiment of the present invention.

A photoelectric conversion device and a method of driving the same according to a second embodiment of the present invention will be described with reference to FIG. 6. FIG. 6 is a block diagram illustrating a general configuration of the photoelectric conversion device according to the present embodiment. The same components as those in the photoelectric conversion device according to the first embodiment are labeled with the same reference, and the description thereof will be omitted.

In the present embodiment, a specific configuration example of the readout circuits 30 and 50 and the operation thereof will be described. Other configurations and respective operations are the same as those in the photoelectric conversion device according to the first embodiment.

As illustrated in FIG. 6, the readout circuit 30 of the photoelectric conversion device 100 according to the present embodiment includes a plurality of comparator circuits 32, a ramp signal generation circuit 36, a counter circuit 38, and a signal processing circuit 40.

The plurality of comparator circuits 32 are provided in association with respective columns of the pixel array in the pixel region 10. Each of the plurality of comparator circuits 32 is connected to the output line 16 on a corresponding column. Further, each of the plurality of comparator circuits 32 is connected to the ramp signal generation circuit 36, the counter circuit 38, and the signal processing circuit 40. Note that, in FIG. 6, depiction of the control circuit 70 is omitted.

The ramp signal generation circuit 36 is a circuit that generates a signal (a ramp signal) whose level gradually increases or otherwise decreases from a predetermined value as time elapses. The ramp signal generation circuit 36 outputs a generated ramp signal to the comparator circuits 32 on respective columns in accordance with a control signal from the control circuit 70. The counter circuit 38 counts clock signals and output a count signal indicating counted value to the comparator circuit 32 on each column.

The comparator circuit 32 on each column includes a differential-input comparator (not illustrated) to which a pixel signal that is an analog signal output from the pixel P via the output line 16 on a corresponding column and a ramp signal output from the ramp signal generation circuit 36 are input. The differential-input comparator compares the signal level of the pixel signal and the signal level of the ramp signal and, when the level relationship between these signal levels is inverted, causes the output signal to transition from a high level to a low level or otherwise a low level to a high level. The comparator circuit 32 outputs, to the signal processing circuit 40, a count value indicated by a count signal received from the counter circuit 38 at the time of inversion of the level of the output signal of the differential-input comparator as digital data of a pixel signal.

The signal processing circuit 40 includes a predetermined signal processing circuit of a CDS circuit or the like. The signal processing circuit 40 performs predetermined signal processing such as a digital CDS process on digital data received from the comparator circuit 32 on each column and generates image data.

Similarly, as illustrated in FIG. 6, the readout circuit 50 of the photoelectric conversion device according to the present embodiment includes a plurality of comparator circuits 52, a ramp signal generation circuit 56, a counter circuit 58, and a signal processing circuit 60.

The plurality of comparator circuits 52 are provided in association with respective rows of the pixel array in the pixel region 10. Each of the plurality of comparator circuits 52 is connected to the output line 18 on a corresponding row. Further, each of the plurality of comparator circuits 52 is connected to the ramp signal generation circuit 56, the counter circuit 58, and the signal processing circuit 60.

The ramp signal generation circuit 56 is a circuit that generates a ramp signal. The ramp signal generation circuit 56 outputs a generated ramp signal to the comparator circuits 52 on respective rows. The counter circuit 58 counts clock signals and outputs a count signal indicating a counted value to the comparator circuits 52 on respective rows.

The comparator circuit 52 on each row includes a differential-input comparator (not illustrated) to which a pixel signal that is an analog signal output from the pixel P via the output line 18 on a corresponding row and a ramp signal output from the ramp signal generation circuit 56 are input. The differential-input comparator compares the signal level of the pixel signal and the signal level of the ramp signal and, when the level relationship between these signal levels is inverted, causes the output signal to transition from a high level to a low level or otherwise a low level to a high level. The comparator circuit 52 outputs, to the signal processing circuit 60, a count value indicated by a count signal received from the counter circuit 58 at the time of inversion of the level of the output signal of the differential-input comparator as digital data of a pixel signal.

The signal processing circuit 60 includes a predetermined signal processing circuit of a CDS circuit or the like. The signal processing circuit 60 performs predetermined signal processing such as a digital CDS process on digital data received from the comparator circuit 52 on each row and generates image data.

In such a way, the readout circuits 30 and 50 include analog-to-digital (AD) conversion units that performs AD conversion in parallel with respect to columns. That is, the photoelectric conversion device of the present embodiment is a photoelectric conversion device with a digital output scheme.

Also in a photoelectric conversion device with the digital output scheme, noise that temporally varies such as fluctuations of a power supply voltage may be mixed in a readout circuit, and a noise component due to such noise may be superimposed on a pixel signal as with the case of the first embodiment. As a specific example, noise from the power supply of the ramp signal generation circuit 36 or 56 may be superimposed on the ramp signal as noise, and as a result, a noise component may be superimposed on digital data output from the comparator circuit 32 or 52. Further, noise from the power supply of the counter circuit 38 or 58 may cause fluctuations in count values, and as a result, a noise component may be superimposed on digital data output from the comparator circuits 32 and 52.

Therefore, also in the photoelectric conversion device according to the present embodiment, by performing the same readout drive as the first embodiment, it is possible to cause the noise superimposed on image data of the reference part 101 and the noise superimposed on image data of the comparison part 102 to be matched. Further, noise superimposed on image data of the reference part 103 and the noise superimposed on image data of the comparison part 104 can be matched. Accordingly, accurate correlation operation can be performed on both the horizontal direction and the vertical direction, and the accuracy of focusing in autofocusing can be improved.

As described above, according to the present embodiment, influence of pattern noise superimposed on a pair of image data can be suppressed, and the accuracy of focusing in autofocusing can be improved.

Third Embodiment

Figure 7:
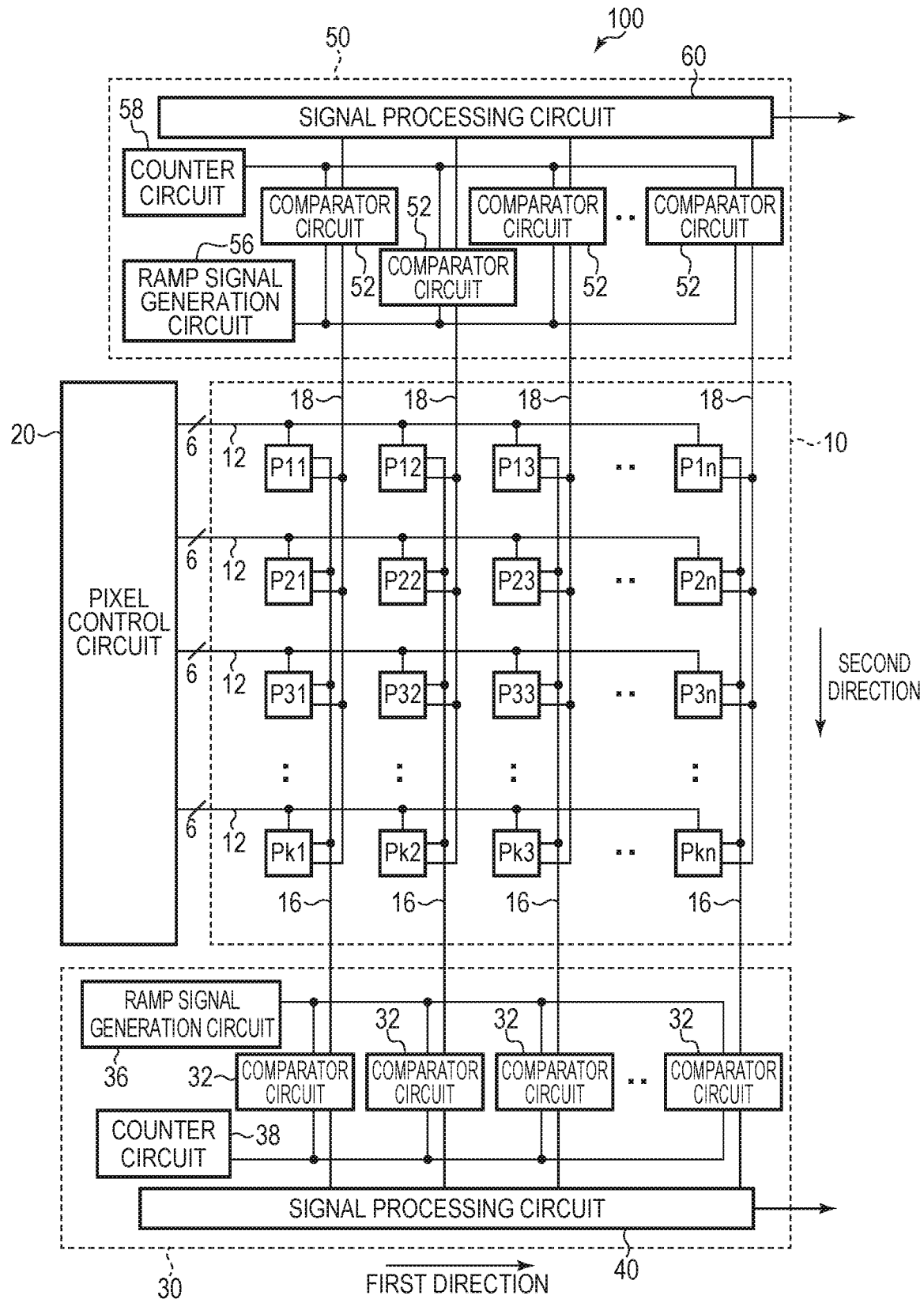
FIG. 7 is a diagram illustrating a general configuration of a photoelectric conversion device according to a third embodiment of the present invention.
Figure 8:
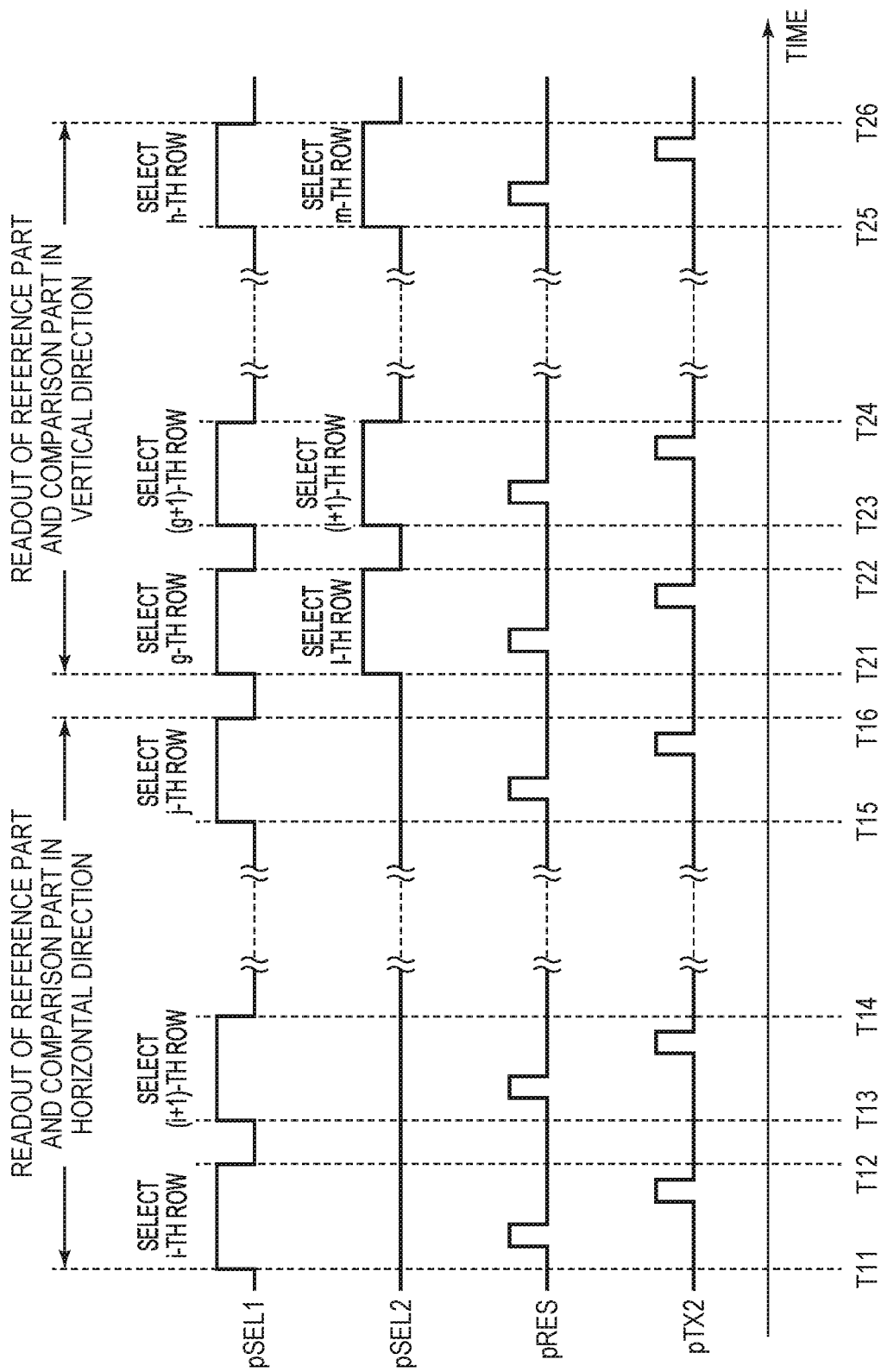
FIG. 8 is a timing diagram illustrating a method of driving the photoelectric conversion device according to the third embodiment of the present invention.

A photoelectric conversion device and a method of driving the same according to a third embodiment of the present invention will be described with reference to FIG. 7 and FIG. 8. FIG. 7 is a block diagram illustrating a general configuration of the photoelectric conversion device according to the present embodiment. FIG. 8 is a timing diagram illustrating a readout operation in the photoelectric conversion device of the present embodiment. The same components as those in the photoelectric conversion devices according to the first and second embodiments are labeled with the same reference, and the description thereof will be omitted or simplified.

As illustrated in FIG. 7, the photoelectric conversion device 100 of the present embodiment includes only the control lines 12 extending in the first direction as control lines that supply control signals from the pixel control circuit 20 to respective pixels P, which makes a difference from those of the first and second embodiments that further include control lines 14 extending in the second direction. The control line 12 arranged on each row of the pixel region 10 includes six signal lines that supply control signals pTX1, pTX2, pRES, pOFD, pSEL1, and pSEL2. That is, the control line 12 of the present embodiment further includes a signal line that supplies the control signal pSEL2 in addition to five signal lines described in the first and second embodiments. The signal line that supplies the control signal pSEL2 is the signal line forming the control line 14 in the first and second embodiments. The signal line that supplies the control signal pSEL2 is connected to the gates of the select transistors M6 of the pixels P belonging to a corresponding row, respectively, to form a signal line common to these pixels P. In other words, it can also be said that the photoelectric conversion device 100 of the present embodiment includes a plurality of control lines 12 extending in the first direction and a plurality of control lines 14 extending in the first direction.

Further, the photoelectric conversion device of the present embodiment is different from the first and second embodiments in that the output line 16 and the output line 18 are arranged in parallel as illustrated in FIG. 7. That is, both the output line 16 and the output line 18 are arranged so as to extend in the second direction (the vertical direction in FIG. 7). The output lines 16 and 18 are connected to the pixels P arranged in the second direction to form signal lines common to these pixels P. Further, because the output lines 16 and 18 are arranged in such a way, the readout circuit 30 and the readout circuit 50 are arranged so as to interpose the pixel region 10 and be located in the second direction.

Note that, as described in the first embodiment, the plurality of control lines 14 are arranged on each of ones of the plurality of rows and the plurality of columns. Further, the plurality of output lines 18 are arranged on each of the others of the plurality of rows and the plurality of columns. In the present embodiment, the plurality of control lines 14 that are a part of the plurality of control lines 12 are arranged on a plurality of rows, respectively, and the plurality of output lines 18 are arranged on a plurality of columns, respectively.

Other configurations and respective operations in the photoelectric conversion device according to the present embodiment are the same as that of the photoelectric conversion device according to the first or second embodiment. Note that, in FIG. 7, depiction of the control circuit 70 is omitted.

Next, a method of driving the photoelectric conversion device according to the present embodiment will be described with reference to FIG. 8. Also in the present embodiment, readout of image data of the reference part 101 and image data of the comparison part 102 are performed by the readout circuit 30, and readout of image data of the reference part 103 and image data of the comparison part 104 are performed by the readout circuit 50.

FIG. 8 is a timing diagram illustrating a readout operation in the photoelectric conversion device of the present embodiment. FIG. 8 illustrates the control signal pSEL1 of the select transistor M5, the control signal pSEL2 of the select transistor M6, the control signal pRES of the reset transistor M3, and the control signal pTX2 of the transfer transistor M2 out of the control signals of the pixel P. When each of these control signals is at a high level, the corresponding transistor is in an on-state. Further, when each of these control signals is at a low level, the corresponding transistor is in an off-state.

In accordance with the control signals illustrated in FIG. 8, selection of the pixel P, reset of the floating diffusion portion FD, readout of a noise signal, transfer of charge, and readout of a light signal are performed. Further, image data is obtained by a CDS circuit (not illustrated) provided in the signal processing circuits 40 and 60 of the readout circuits 30 and 50.

In the present embodiment, an example in which readout of image data of the reference part 101 in the horizontal direction and readout of image data of the comparison part 102 in the horizontal direction are simultaneously performed and then readout of image data of the reference part 103 in the vertical direction and readout of image data of the comparison part 104 in the vertical direction are simultaneously performed will be described. In FIG. 8, the period from time T11 to time T16 is a period in which image data of the reference part 101 and image data of the comparison part 102 are read out, and the period from time T21 to time T26 is a period in which image data of the reference part 103 and image data of the comparison part 104 are read out.

The period from time T11 to time T12 is a period in which readout of signals from the pixels P belonging to the i-th row is performed. Note that the i-th row is the leading row of the reference part 101 and the comparison part 102, and the j-th row is the last row of the reference part 101 and the comparison part 102 (see FIG. 3).

During the period from time T11 to time T12, the pixel control circuit 20 controls the control signal pSEL1 supplied to the control line 12 on the i-th row to the high level. Thereby, the select transistors M5 of the pixels P belonging to the i-th row are turned on, and the pixels P belonging to the i-th row are selected. That is, the pixels P belonging to the i-th row are ready for outputting pixel signals to the readout circuit 30 via the output lines 16 on the corresponding columns.

A period in which the control signal pRES is at the high level out of the period from time T11 to time T12 of FIG. 8 is a reset period for the floating diffusion portion FD. Further, the period in which the control signal pTX2 is at the high level corresponds to the period from time T2 to time T3 of FIG. 4 and is a transfer period for charge from the charge holding portion MEM to the floating diffusion portion FD. A pixel signal read out to the output line 16 between the reset period and the transfer period is a noise signal in accordance with a reset voltage of the floating diffusion portion FD. Further, a pixel signal read out after the transfer period to the output line 16 is a light signal in accordance with the amount of charge generated in the photoelectric converter PD.

A noise signal and a light signal read out from the pixels P belonging to the i-th row to the readout circuit 30 are differentially processed in the CDS circuit provided in the readout circuit 30 to form image data on the i-th row.

Subsequently, in the same manner as the readout of image data from the pixels P belonging to the i-th row, readout of signals from the (i+1)-th row to the j-th row is repeated. FIG. 8 illustrates a case where readout of signals from the pixels P belonging to the (i+1)-th row is performed from time T13 to time T14 and readout of signals from the pixels P belonging to the j-th row is performed from time T15 to time T16, as an example.

In such a way, readout of pixel signals from all the pixels P belonging to the reference part 101 and the comparison part 102 arranged in the horizontal direction is performed to acquire image data of the reference part 101 and the comparison part 102.

Note that, since there is no pixel P forming the reference part 103 and the comparison part 104 from the i-th row to the j-th row on which the reference part 101 and the comparison part 102 are arranged, a readout operation on the reference part 101 and the comparison part 102 does not affect the pixels P of the reference part 103 and the comparison part 104.

The period from time T21 to time T22 is a period in which readout of signals from the pixels P belonging to the g-th row and the l-th row is performed. Note that the g-th row is the leading row of the reference part 103, and the l-th row is the leading row of the comparison part 104. Further, the h-th row is the last row of the reference part 103, and the m-th row is the last row of the comparison part 104 (see FIG. 3).

During the period from time T21 to time T22, the pixel control circuit 20 controls the control signal pSEL1 supplied to the control line 12 on the g-th row to the high level. Thereby, the select transistors M5 of the pixels P belonging to the g-th row are turned on, and the pixels P belonging to the g-th row are selected. That is, the pixels P belonging to the g-th row are ready for outputting pixel signals to the readout circuit 30 via the output lines 16 on the corresponding columns.

Similarly, during the period from time T21 to time T22, the pixel control circuit 20 controls the control signal pSEL1 supplied to the control line 12 on the l-th row to the high level. Thereby, the select transistors M6 of the pixels P belonging to the l-th row are turned on, and the pixels P belonging to the l-th row are selected. That is, the pixels P belonging to the l-th row are ready for outputting pixel signals to the readout circuit 50 via the output lines 18 on the corresponding columns.

A period in which the control signal pRES is at the high level out of the period from time T21 to time T22 of FIG. 8 is a reset period for the floating diffusion portion FD. Further, the period in which the control signal pTX2 is at the high level corresponds to the period from time T2 to time T3 of FIG. 4 and is a transfer period for charge from the charge holding portion MEM to the floating diffusion portion FD. Pixel signals read out to the output lines 16 and 18 between the reset period and the transfer period are noise signals in accordance with a reset voltage of the floating diffusion portion FD. Further, pixel signals read out after the transfer period to the output lines 16 and 18 are light signals in accordance with the amount of charge generated in the photoelectric converter PD.

A noise signal and light signal read out from the pixels P belonging to the g-th row to the readout circuit 30 are differentially processed in the CDS circuit provided in the readout circuit 30 to form image data on the g-th row. Further, a noise signal and a light signal read out from the pixels P belonging to the l-th row to the readout circuit 50 are differentially processed in the CDS circuit provided in the readout circuit 50 to form image data on the l-th row.

In this operation, the timing to read out a noise signal from the pixels P belonging to the g-th row and the timing to read out a noise signal from the pixels P belonging to the l-th row are matched. Further, the timing to read out a light signal from the pixels P belonging to the g-th row and the timing to read out a light signal from the pixels P belonging to the l-th row are matched. This can reduce influence caused when noise superimposed on a signal read out from the pixels P belonging to the g-th row and noise superimposed on a signal read out from the pixels P belonging to the l-th row temporally vary.

Subsequently, in the same manner as the readout of image data from the pixels P belonging to the g-th row and the l-th row, readout of signals from the (g+1)-th row to the h-th row and readout of signals from the (l+1)-th row to the m-th row are repeated. FIG. 8 illustrates a case where readout of signals from the pixels P belonging to the (g+1)-th row and the (l+1)-th row is performed from time T23 to time T24 and readout of signals from the pixels P belonging to the h-th row and the m-th row is performed from time T25 to time T26, as an example.

Note that, while the g-th row to the h-th row are read out in this order for the reference part 103 and the l-th row to the m-th row are read out in this order for the comparison part 104 in the drive example of FIG. 8, rows in one of the regions may be read out in the reverse order. That is, the g-th row to the h-th row may be read out in this order for the reference part 103, and the m-th row to the l-th row may be read out in this order for the comparison part 104. Alternatively, the h-th row to the g-th row may be read out in this order for the reference part 103, and the l-th row to the m-th row may be read out in this order for the comparison part 104. With such a configuration, the pixels P located at symmetrical positions about the center of the pixel region 10 can be read out simultaneously.

In such a way, readout of pixel signals from all the pixels P belonging to the reference part 103 and the comparison part 104 arranged in the vertical direction is performed to acquire image data of the reference part 103 and image data of the comparison part 104.

With such a readout operation, the noise amounts superimposed on image data of the reference part 101 and image data of the comparison part 102 can be matched, and the noise amounts superimposed on image data of the reference part 103 and image data of the comparison part 104 can be matched.

Therefore, according to the photoelectric conversion device of the present embodiment, accurate correlation operation can be performed on both the horizontal direction and the vertical direction, and the accuracy of focusing in autofocusing can be improved.

As described above, according to the present embodiment, influence of pattern noise superimposed on a pair of image data can be suppressed, and the accuracy of focusing in autofocusing can be improved.

Fourth Embodiment

Figure 9:
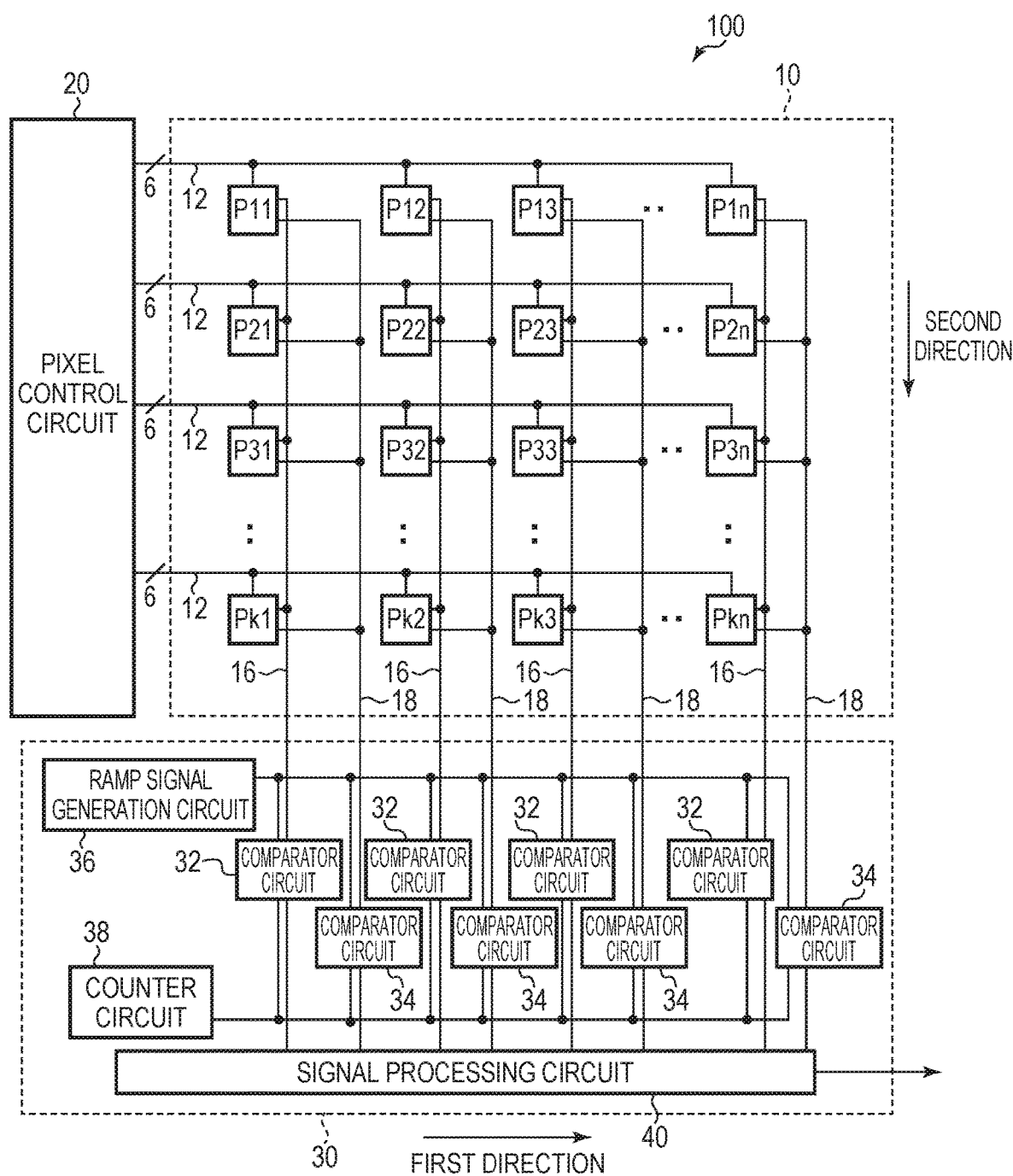
FIG. 9 is a diagram illustrating a general configuration of a photoelectric conversion device according to a fourth embodiment of the present invention.

A photoelectric conversion device and a method of driving the same according to a fourth embodiment of the present invention will be described with reference to FIG. 9. FIG. 9 is a block diagram illustrating a general configuration of the photoelectric conversion device according to the present embodiment. The same components as those in the photoelectric conversion devices according to the first to third embodiments are labeled with the same reference, and the description thereof will be omitted or simplified.

In the present embodiment, a photoelectric conversion device configured to use a single readout circuit 30 to implement the functions of the readout circuits 30 and 50 in the photoelectric conversion device according to the third embodiment will be described.

The photoelectric conversion device 100 of the present embodiment is the same as that of the third embodiment in that only the control lines 12 extending in the first direction are included as control lines that supply control signals to respective pixels P from the pixel control circuit 20 as illustrated in FIG. 9. Further, the photoelectric conversion device of the present embodiment is the same as that of the third embodiment in that the output lines 16 and the output lines 18 are arranged in parallel as illustrated in FIG. 9.

On the other hand, the photoelectric conversion device of the present embodiment is different from that of the third embodiment including two readout circuits 30 and 50 in that the readout circuit 30 includes two comparator circuits 32 and 34 in association with each column of the pixel array in the pixel region 10. The comparator circuit 32 provided on each column is connected to the output line 16 arranged on a corresponding column. Further, the comparator circuit 34 provided on each column is connected to the output line 18 arranged on a corresponding column. The comparator circuits 32 and 34 on each column are connected to the ramp signal generation circuit 36, the counter circuit 38, and the signal processing circuit 40. That is, the comparator circuits 32 and 34 on the same column are supplied with a common ramp signal from the single ramp signal generation circuit 36 and supplied with a common count signal from the single counter circuit 38.

Other configurations and respective operations in the photoelectric conversion device according to the present embodiment are basically the same as those of the photoelectric conversion device according to the third embodiment. In the present embodiment, the function of the comparator circuit 52 of the readout circuit 50 described in the third embodiment is performed by the comparator circuit 34 of the readout circuit 30. Further, the function of the signal processing circuit 60 of the readout circuit 50 described in the third embodiment is performed by the signal processing circuit 40 of the readout circuit 30. Note that, in FIG. 9, depiction of the control circuit 70 is omitted.

Since the readout operation in the photoelectric conversion device according to the present embodiment is the same as that in the timing diagram of the third embodiment illustrated in FIG. 8, the description thereof will be omitted here.

Also in the present embodiment, the noise amounts superimposed on image data of the reference part 101 and image data of the comparison part 102 can be matched, and the noise amounts superimposed on image data of the reference part 103 and image data of the comparison part 104 can be matched in the same manner as the third embodiment. Further, in the photoelectric conversion device according to the present embodiment, since image data of the reference part 103 and image data of the comparison part 104 are read out by the single readout circuit 30, influence of noise superimposed on a ramp signal or a count signal can be further suppressed compared to the third embodiment.

Therefore, according to the photoelectric conversion device of the present embodiment, accurate correlation operation can be performed on both the horizontal direction and the vertical direction, and the accuracy of focusing in autofocusing can be improved.

As described above, according to the present embodiment, influence of pattern noise superimposed on a pair of image data can be suppressed, and the accuracy of focusing in autofocusing can be improved.

Fifth Embodiment

Figure 10:
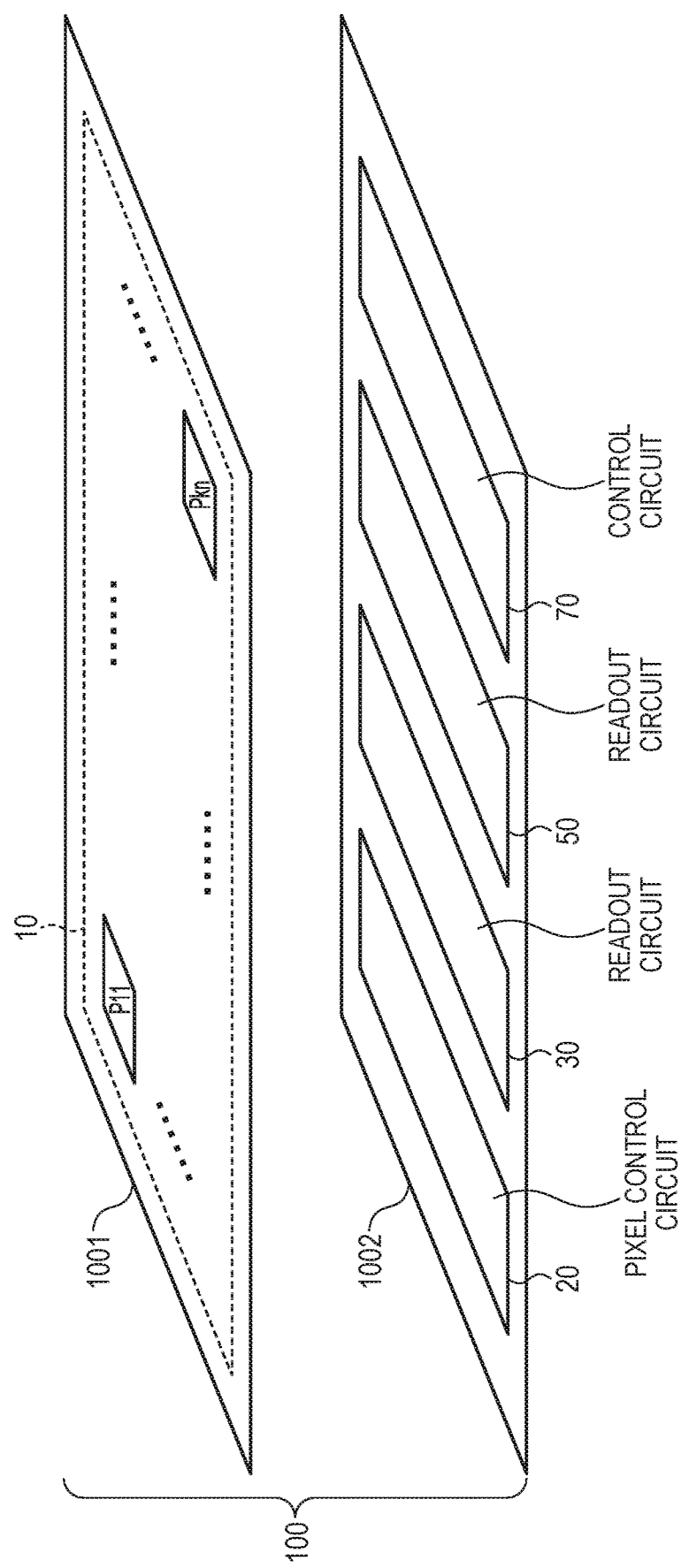
FIG. 10 is a diagram illustrating a general configuration of a photoelectric conversion device according to a fifth embodiment of the present invention.

A photoelectric conversion device and a method of driving the same according to a fifth embodiment of the present invention will be described with reference to FIG. 10 and FIG. 11. FIG. 10 is a diagram illustrating a configuration of the photoelectric conversion device according to the present embodiment. The same components as those in the photoelectric conversion devices according to the first to fourth embodiments are labeled with the same reference, and the description thereof will be omitted or simplified.

FIG. 10 is a diagram illustrating a first substrate 1001 and a second substrate 1002 provided in the photoelectric conversion device 100 of the present embodiment. The pixel region 10 is arranged in the first substrate 1001. The plurality of pixels P arranged in a matrix over a plurality of rows and a plurality of columns are provided in the pixel region 10. Further, the pixel control circuit 20, the reading circuits 30 and 50, and the control circuit 70 are arranged in the second substrate 1002. Note that, while only the pixels P of the pixel region 10, the pixel control circuit 20, the readout circuits 30 and 50, and the control circuit 70 are illustrated in FIG. 10, the plurality of control lines 12 and the plurality of output lines 16 and 18 are arranged in the first substrate 1001 in addition as appropriate.

The pixel control circuit 20 is a pixel control unit that supplies, to the pixels P via control lines, control signals used for driving readout circuits within the pixel P when signals are read out from the pixels P. The pixel control circuit 20 may be formed of logic circuits such as a shift register, an address decoder, or the like.

The readout circuits 30 and 50 each are a circuit unit that performs a predetermined process, for example, signal processing such as a CDS process, an amplification process, analog-to-digital conversion, or the like on a signal read out from the pixel P. The readout circuits 30 and 50 may each include a signal holding unit, a CDS circuit, a column amplifier, or the like. The readout circuits 30 and 50 each output a pixel signal on which a predetermined process has been performed to a signal processing unit (not illustrated) inside the photoelectric conversion device 100 or outside the photoelectric conversion device.

The control circuit 70 is a circuit unit that supplies, to the pixel control circuit 20 and the readout circuits 30 and 50, control signals used for controlling the operation and the timing thereof. Note that some or all of the control signals supplied to the pixel control circuit 20 and the readout circuits 30 and 50 may be supplied from the outside of the photoelectric conversion device 100.

Figure 11:
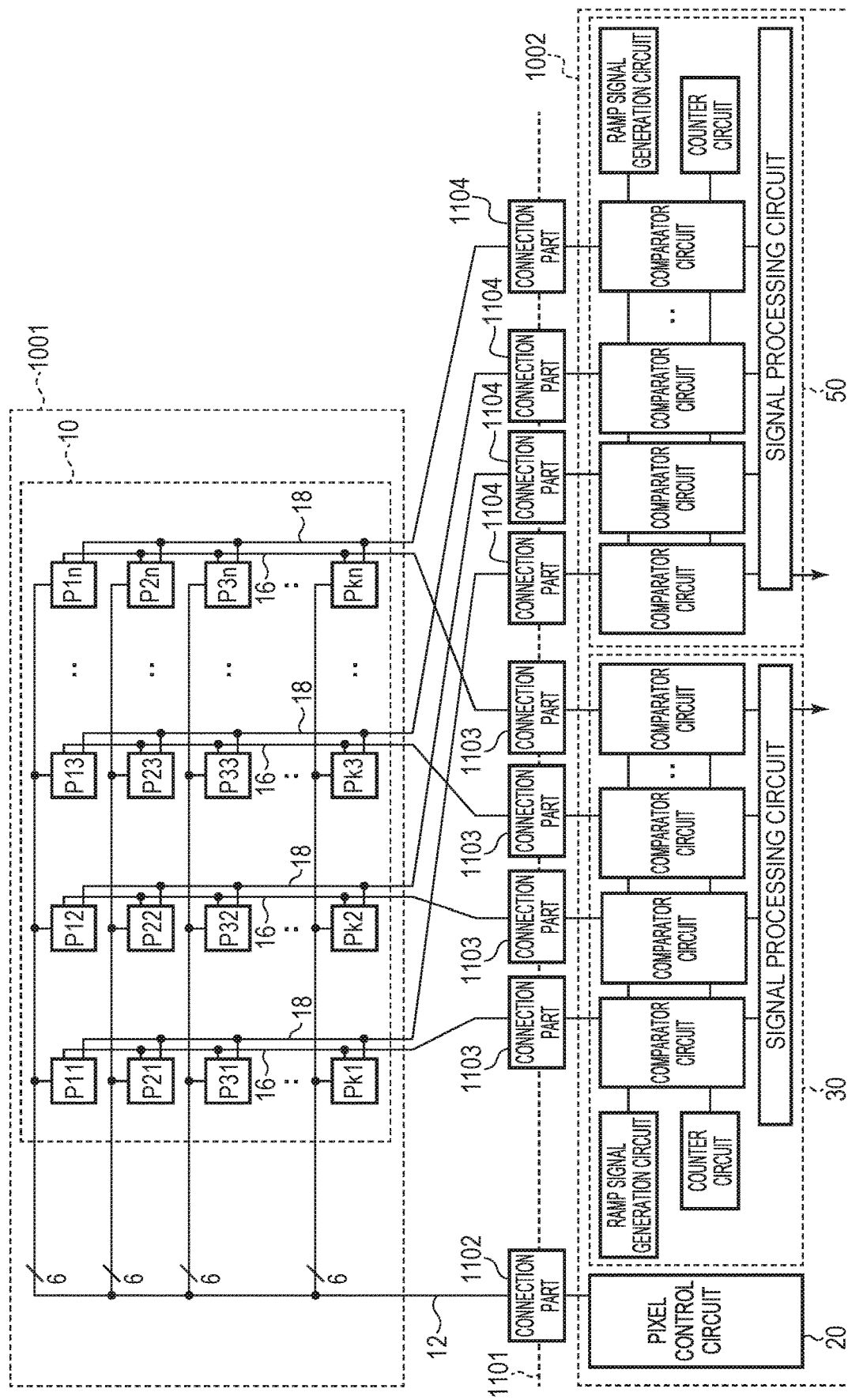
FIG. 11 is a diagram illustrating a general configuration of the photoelectric conversion device according to the fifth embodiment of the present invention.

FIG. 11 is a diagram illustrating the arrangement of the pixels P provided in the first substrate 1001 and the pixel control circuit 20 and the readout circuits 30 and 50 provided in the second substrate 1002 in plan view.

The imaging device of the present embodiment is a backside irradiation type imaging device. The pixel P includes a photoelectric converter (not illustrated). The control line 12 is provided between the photoelectric converter and a junction interface 1101. The control lines 12 on each row include six signal lines that supply control signals pTX1, pTX2, pRES, pOFD, pSEL1, and pSEL2. The control line 12 extends in the first direction (the horizontal direction in FIG. 11) of the pixel region 10. Similarly, the output lines 16 and 18 are provided between the photoelectric converter and the junction interface 1101. The output lines 16 and 18 extend in the second direction (the vertical direction in FIG. 11) of the pixel P.

The control line 12 is connected to the pixel control circuit 20 of the second substrate 1002 via the connection part 1102. Each of the output lines 16 is connected to the readout circuit 30 of the second substrate 1002 via each of the connection parts 1103. Each of the output lines 18 is connected to the readout circuit 50 of the second substrate 1002 via each of the connection parts 1104. Thereby, signals output from the pixels P to the output lines 16 are input to the readout circuit 30, and signals output from the pixels P to the output lines 18 are input to the readout circuit 50.

In the present embodiment, the readout circuits 30 and 50 are arranged in the second substrate 1002. However, the configuration of the function blocks in the photoelectric conversion device is the same as that of the third embodiment. That is, other configurations and respective operations in the photoelectric conversion device according to the present embodiment are the same as those of the photoelectric conversion device according to the third embodiment. Note that, in FIG. 11, depiction of the control circuit 70 is omitted. Further, since the readout operation in the photoelectric conversion device according to the present embodiment is the same as that of the timing diagram in the third embodiment illustrated in FIG. 8, the description thereof will be omitted here.

Also in the present embodiment, the noise amounts superimposed on image data of the reference part 101 and image data of the comparison part 102 can be matched, and the noise amounts superimposed on image data of the reference part 103 and image data of the comparison part 104 can be matched in the same manner as the third embodiment.

Therefore, according to the photoelectric conversion device of the present embodiment, accurate correlation operation can be performed on both the horizontal direction and the vertical direction, and the accuracy of focusing in autofocusing can be improved.

As described above, according to the present embodiment, influence of pattern noise superimposed on a pair of image data can be suppressed, and the accuracy of focusing in autofocusing can be improved.

Sixth Embodiment

Figure 12:
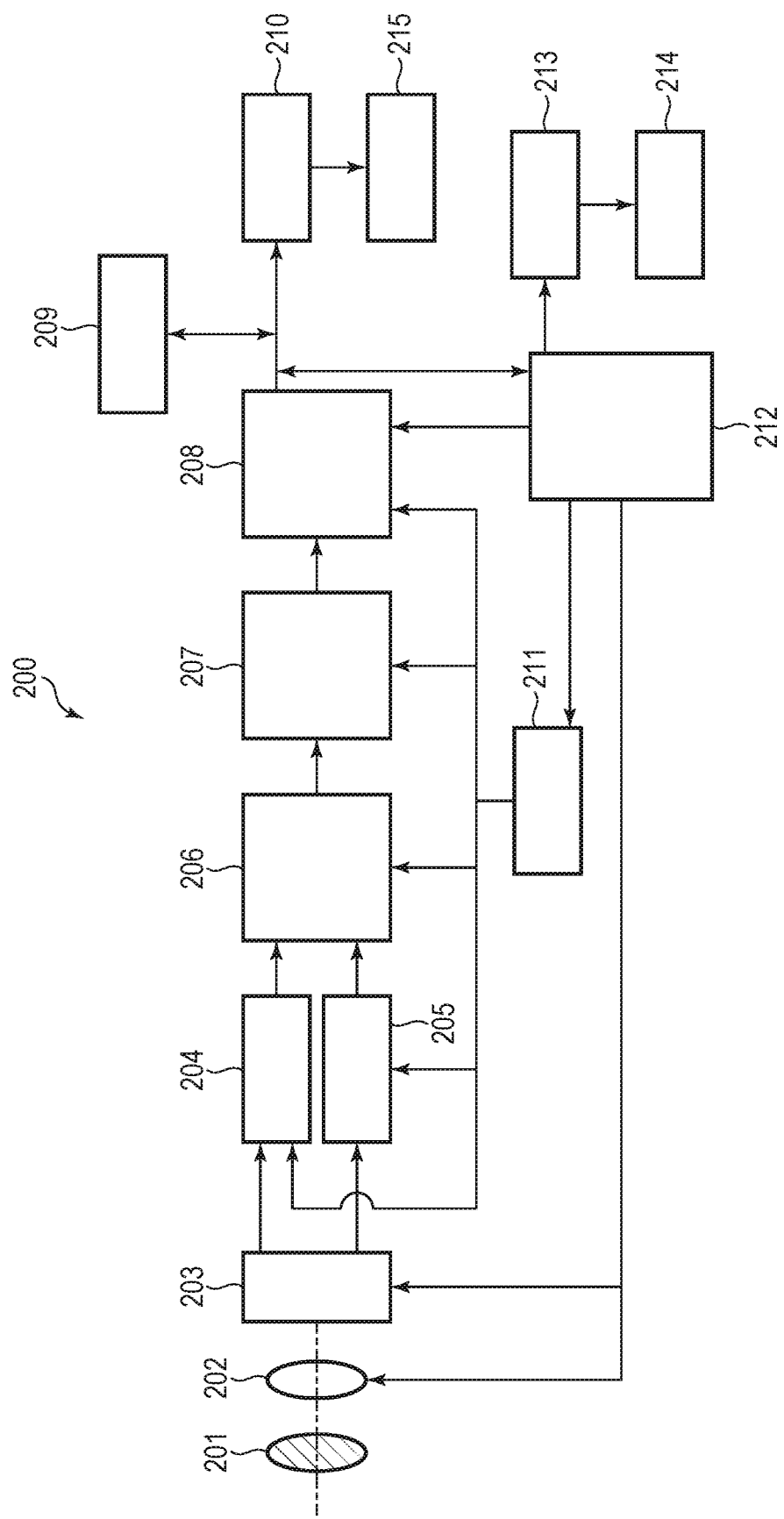
FIG. 12 is a block diagram illustrating a general configuration of an imaging system according to a sixth embodiment of the present invention.
Figure 13:
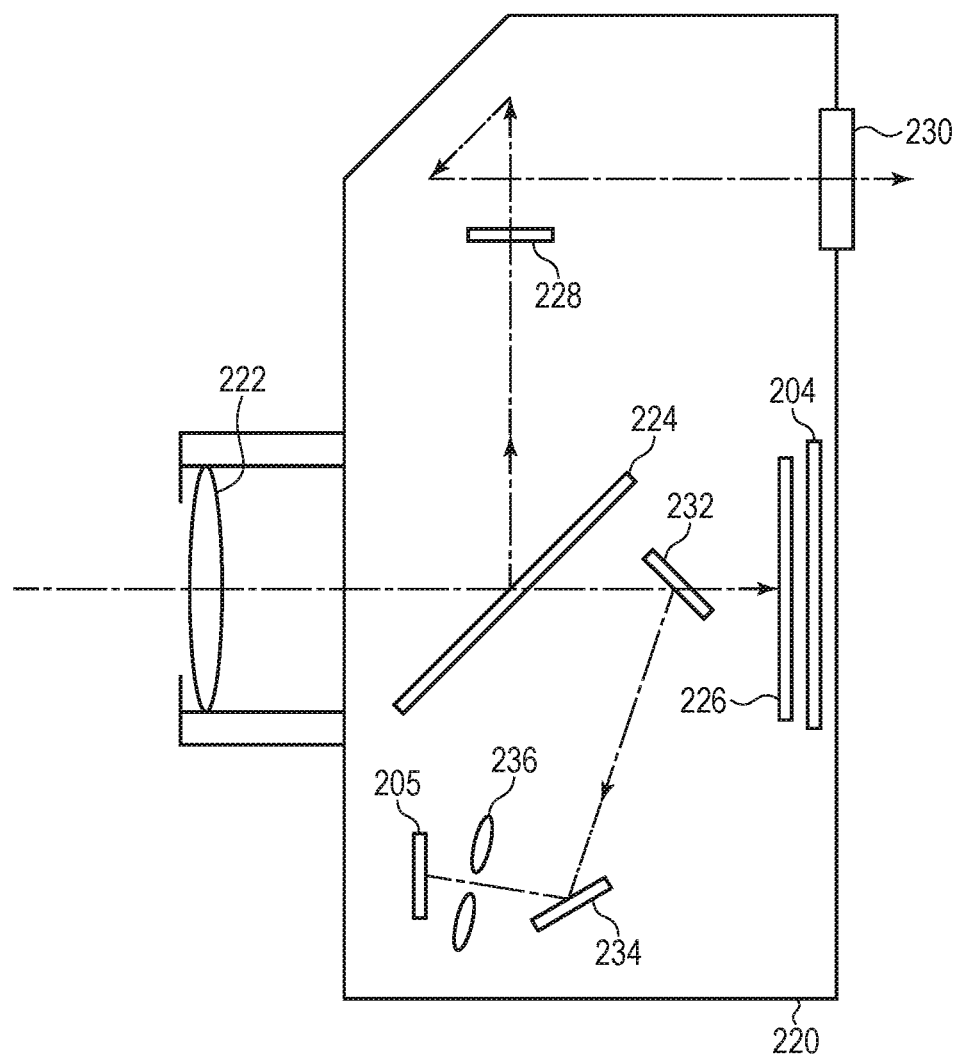
FIG. 13 is a schematic diagram illustrating an arrangement example of an optical system of an imaging device according to the sixth embodiment of the present invention.

An imaging system according to the sixth embodiment of the present invention will be described with reference to FIG. 12 and FIG. 13. The same components as those in the photoelectric conversion devices according to the first to fifth embodiments are labeled with the same reference, and the description thereof will be omitted or simplified. FIG. 12 is a block diagram illustrating a configuration example of the imaging system according to the present embodiment. FIG. 13 is a schematic diagram illustrating an arrangement example of an optical system in the imaging system according to the present embodiment.

As illustrated in FIG. 12, the imaging system 200 according to the present embodiment includes a barrier 201, a lens 202, an aperture 203, a solid-state imaging device 204, and an AF sensor 205. The lens 202 is an optical system for capturing an optical image of an object. The barrier 201 is for protecting the lens 202. The aperture 203 is for adjusting a light amount of a light passing through the lens 202. The solid-state imaging device 204 is for acquiring an optical image of an object captured through the lens as an image signal. The AF sensor 205 is the photoelectric conversion device 100 described in the first to fourth embodiments.

Further, the imaging system 200 further includes an analog signal processing device 206, an analog-to-digital (A/D) converter 207, and a digital signal processing unit 208. The analog signal processing device 206 is for processing a signal output from the solid-state imaging device 204 or the AF sensor 205. The A/D converter 207 is for performing analog-to-digital conversion on a signal output from the analog signal processing device 206. The digital signal processing unit 208 is for performing an operation to perform various correction or data compression on image data output from the A/D converter 207.

Further, the imaging system 200 further includes a memory unit 209, an external I/F circuit 210, a timing generation unit 211, a general control/operation unit 212, and a storage medium control I/F unit 213. The memory unit 209 is for temporarily storing image data. The external I/F circuits 210 is for communicating with an external device such as an external computer 215. The timing generation unit 211 is for outputting various timing signals to the digital signal processing unit 208 or the like. The general control/operation unit 212 is for controlling various operations and the whole camera. The storage medium control I/F unit 213 is for transferring data with the removable storage medium 214 such as a semiconductor memory used for storing acquired image data or reading out image data.

When the barrier 201 is opened, an optical image from an object enters the AF sensor 205 via the lens 202 and the aperture 203. The general control/operation unit 212 calculates a distance to the object by using the scheme of phase difference detection described above based on an output signal from the AF sensor 205. The general control/operation unit 212 then performs autofocusing control to drive the lens 202 based on a calculation result, again determine whether or not focusing is successfully obtained on a capturing plane, and again drive the lens 202 if it is not determined that focusing is successful.

Subsequently, after focusing is confirmed, a charge accumulation operation performed by the solid-state imaging device 204 is started. Upon the completion of the charge accumulation operation of the solid-state imaging device 204, an image signal output from the solid-state imaging device 204 is digitally converted by the A/D converter 207 after a predetermined process is performed thereon by the analog signal processing device 206. The digitally converted image signal is written to the memory unit 209 by the general control/operation unit 212 via the digital signal processing unit 208.

The data accumulated in the memory unit 209 is then stored in the storage unit 214 via the storage medium control I/F unit 213 under the control of the general control/operation unit 212. Alternatively, data accumulated in the memory unit 209 may be input directly to the external computer 215 or the like via the external I/F circuit 210.

FIG. 13 is a general diagram illustrating an arrangement example of the optical system in the imaging system according to the present embodiment. The arrangement example of the optical system illustrated in FIG. 13 assumes a single-lens reflex camera on which a two-dimensional image-capturing phase difference detection type autofocus system is mounted.

An object image enters the inside of a camera body 220 via a capturing lens 222. The capturing lens 222 is a lens for causing an object image to be temporarily captured on the solid-state imaging device 204. The object image that has passed through the capturing lens 222 is guided to a quick return mirror 224. The quick return mirror 224 is a half mirror having a transmittance of around several tens %. Thereby, the object image is guided to the solid-state imaging device 204 via a focal plane shutter 226 and guided to a finder 230 via a finder screen 228. A sub-mirror 232 is arranged between the quick return mirror 224 and the solid-state imaging device 204, and an object image reflected by the sub-mirror 232 is re-captured on the AF sensor 205 via a reflection mirror 234 and a secondary capturing lens 236.

As described in the first to fifth embodiments, by configuring the AF sensor 205 by using the photoelectric conversion device 100 illustrated in the preceding embodiments, it is possible to improve focus detection accuracy. Therefore, according to the imaging system of the present embodiment using the AF sensor 205, it is possible to acquire a higher definition image.

Seventh Embodiment

Figure 14A:
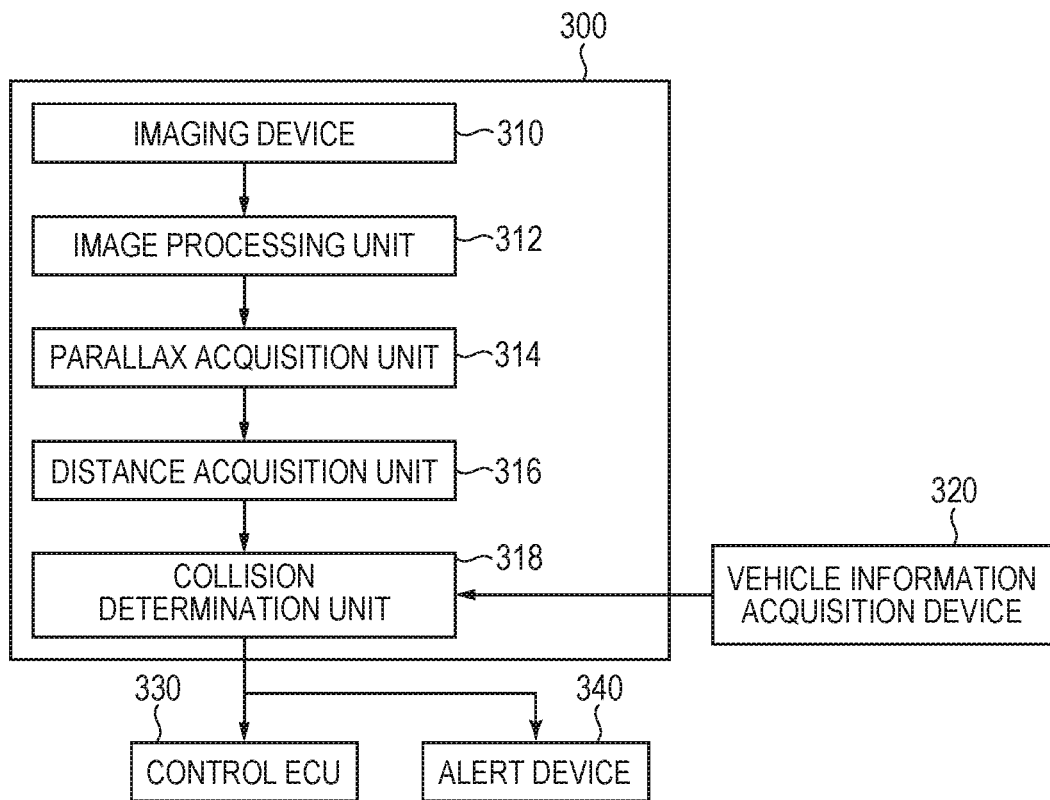
FIG. 14A is a diagram illustrating a configuration example of an imaging system according to a seventh embodiment of the present invention.
Figure 14B:
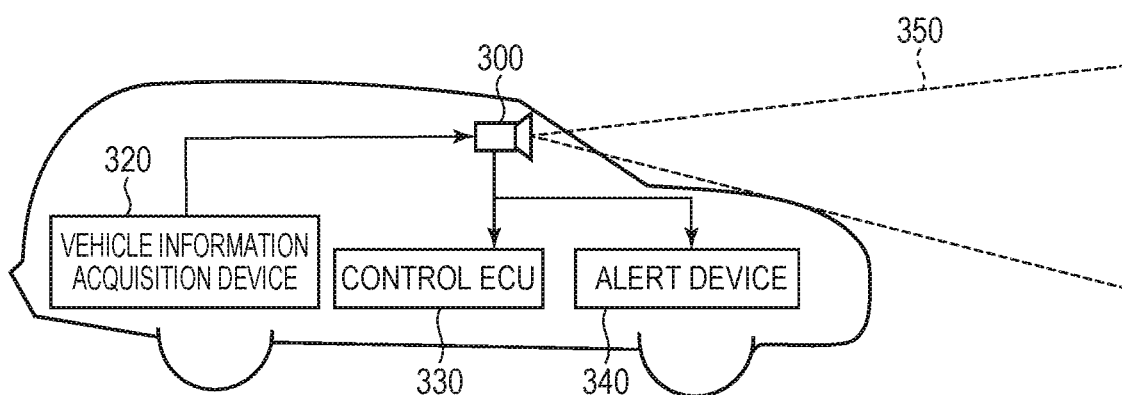
FIG. 14B is a diagram illustrating a configuration example of a movable object according to the seventh embodiment of the present invention.

An imaging system and a movable object according to a seventh embodiment of the present invention will be described with reference to FIG. 14A and FIG. 14B. FIG. 14A is a diagram illustrating the configuration of the imaging system according to the present embodiment. FIG. 14B is a diagram illustrating the configuration of the movable object according to the present embodiment.

FIG. 14A illustrates an example of an imaging system related to an on-vehicle camera. An imaging system 300 includes an imaging device 310. The imaging device 310 is not necessarily limited to a device intended for acquisition of an image, and the photoelectric conversion device 100 described in any of the above first to fifth embodiments can be applied thereto. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition device that acquires distance information on the distance to the object. That is, the distance information is information on a parallax, a defocus amount, a distance to an object, or the like. The collision determination unit 318 may use any of the distance information to determine the collision possibility. The distance information acquisition device may be implemented by dedicatedly designed hardware or may be implemented by a software module. Further, the distance information acquisition device may be implemented by a Field Programmable Gate Array (FPGA), an Application Specific Integrated Circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 14B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, while the pixel P including the charge drain transistor M7 has been illustrated in the above embodiments, the pixel P is not necessarily required to have the charge drain transistor M7. In such a case, it is possible to define the start time of an exposure period at the timing when the transfer transistor M1 is turned off as described above.

Further, while an example in which the photoelectric conversion device of the present invention is applied to an AF sensor has been illustrated in the above first to fifth embodiments, the use of the photoelectric conversion device of the present invention is not limited to an AF sensor. For example, the photoelectric conversion device of the present invention is also applicable to an AE sensor or the like.

Further, the imaging system illustrated in the above sixth and seventh embodiments is an example of an imaging system to which the photoelectric conversion device of the present invention may be applied, and an imaging system to which the photoelectric conversion device of the present invention can be applied is not limited to the configuration illustrated in FIG. 12 to FIG. 14A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-014424, filed Jan. 30, 2019, which is hereby incorporated by reference herein in its entirety.

What is claimed is:

1. A photoelectric conversion device comprising:
a pixel region in which a plurality of pixels each including a photoelectric converter are arranged to form a plurality of rows and a plurality of columns; and
a pixel control circuit that supplies control signals to the plurality of pixels,
wherein the pixel region includes a first readout region, a second readout region, a third readout region, and a fourth readout region,
wherein a first pixel in the first readout region and a second pixel in the second readout region are arranged on a first row and on different columns,
wherein a third pixel in the third readout region and a fourth pixel in the fourth readout region are arranged on a first column and on different rows,
wherein the first row on which the first pixel and the second pixel are arranged is arranged between a row on which the third pixel is arranged and a row on which the fourth pixel is arranged, and
wherein the pixel control circuit performs an operation of simultaneously reading out a pixel signal of the first pixel and a pixel signal of the second pixel in a first period and performs an operation of simultaneously reading out a pixel signal of the third pixel and a pixel signal of the fourth pixel in a second period that is different from the first period.

2. The photoelectric conversion device according to claim 1 further comprising:
a plurality of first control lines each connected to the pixels on a corresponding row such that at least any one of the plurality of first control lines is arranged on each of the plurality of rows;
a plurality of second control lines each connected to the pixels on a corresponding column such that at least any one of the plurality of second control lines is arranged on each of the plurality of columns;
a plurality of first output lines each configured to output signals from the pixels on a corresponding column in accordance with the control signals supplied from the pixel control circuit via the first control lines, at least any one of the plurality of first output lines being arranged on each of the plurality of columns; and
a plurality of second output lines each configured to output signals from the pixels on a corresponding row in accordance with the control signals supplied from the pixel control circuit via the second control lines, at least any one of the plurality of second output lines being arranged on each of the plurality of rows.

3. The photoelectric conversion device according to claim 2, wherein the pixel control circuit is configured to perform an operation of reading out a pixel signal of the first pixel and a pixel signal of the second pixel via the first output lines on corresponding columns, respectively, and reading out a pixel signal of the third pixel and a pixel signal of the fourth pixel via the second output lines on corresponding rows, respectively.

4. The photoelectric conversion device according to claim 2 further comprising a readout circuit connected to the plurality of first output lines and the plurality of second output lines.

5. The photoelectric conversion device according to claim 4, wherein the readout circuit includes an analog-to-digital conversion unit.

6. The photoelectric conversion device according to claim 4, wherein the readout circuit includes a first readout circuit connected to the plurality of first output lines and a second readout circuit connected to the plurality of second output lines.

7. The photoelectric conversion device according to claim 2, wherein each of the plurality of pixels includes
an amplifier unit that amplifies a signal based on charge generated in the photoelectric converter,
a first select transistor that outputs a signal amplified by the amplifier unit to corresponding one of the first output lines in accordance with one of the control signals supplied to corresponding one of the first control lines, and
a second select transistor that outputs a signal amplified by the amplifier unit to corresponding one of the second output lines in accordance with one of the control signals supplied to corresponding one of the second control lines.

8. The photoelectric conversion device according to claim 1 further comprising:

a plurality of first control lines each connected to the pixels on a corresponding row such that at least any one of the plurality of first control lines is arranged on each of the plurality of rows;

a plurality of second control lines each connected to the pixels on a corresponding row such that at least any one of the plurality of second control lines is arranged on each of the plurality of rows;

a plurality of first output lines each configured to output signals from the pixels on a corresponding column in accordance with the control signals supplied from the pixel control circuit via the first control lines, at least any one of the plurality of first output lines being arranged on each of the plurality of columns; and a plurality of second output lines each configured to output signals from the pixels on a corresponding column in accordance with the control signals supplied from the pixel control circuit via the second control lines, at least any one of the plurality of second output lines being arranged on each of the plurality of columns.

9. The photoelectric conversion device according to claim 8, wherein the pixel control circuit is configured to perform an operation of reading out a pixel signal of the first pixel and a pixel signal of the second pixel via the first output lines on corresponding columns, respectively, reading out a pixel signal of the third pixel via corresponding one of the first output lines on a corresponding column, and reading out a pixel signal of the fourth pixel via corresponding one of the second output lines on a corresponding column.

10. The photoelectric conversion device according to claim 1,
wherein the first readout region and the second readout region form a first pair of focus detection regions used for detecting a parallax in a first direction, and
wherein the third readout region and the fourth readout region form a second pair of focus detection regions used for detecting a parallax in a second direction intersecting the first direction.

11. The photoelectric conversion device according to claim 1, wherein each of the first readout region, the second readout region, the third readout region, and the fourth readout region is formed of a block comprising a plurality of pixels on consecutive rows and consecutive columns.

12. An imaging system comprising:
the photoelectric conversion device according to claim 1;
a solid-state imaging device that outputs an optical image of an object as an image signal;
an operation unit that calculates a distance to the object based on an output signal of the photoelectric conversion device; and
a control unit that, based on the distance calculated by the operation unit, outputs a control signal used for controlling an optical system so that the optical image of the object is focused on a capturing plane of the solid-state imaging device.

13. A movable object comprising:
the photoelectric conversion device according to claim 1;
a distance information acquisition device that acquires distance information on a distance to an object, from a parallax image based on signals from the photoelectric conversion device; and
a control device that controls the movable object based on the distance information.

14. A photoelectric conversion device comprising:

a pixel region in which a plurality of pixels each including a photoelectric converter are arranged to form a plurality of rows and a plurality of columns;

a plurality of first control lines each connected to the pixels on a corresponding row such that at least any one of the plurality of first control lines is arranged on each of the plurality of rows;

a plurality of second control lines each connected to the pixels on a corresponding column such that at least any one of the plurality of second control lines is arranged on each of the plurality of columns;

a pixel control circuit connected to the plurality of first control lines and the plurality of second control lines and configured to supply control signals used for controlling the pixels to the plurality of first control lines and the plurality of second control lines;

a plurality of first output lines each arranged on each of the plurality of columns and configured to output signals from the pixels on a corresponding column in accordance with the control signals supplied from the pixel control circuit via the first control lines; and a plurality of second output lines each arranged on each of the plurality of rows and configured to output signals from the pixels on a corresponding row in accordance with the control signals supplied from the pixel control circuit via the second control lines, wherein the pixel region includes a first readout region, a second readout region, a third readout region, and a fourth readout region, wherein a first pixel in the first readout region and a second pixel in the second readout region are arranged on a first row and on different columns, wherein a third pixel in the third readout region and a fourth pixel in the fourth readout region are arranged on a first column and on different rows, and wherein the first row on which the first pixel and the second pixel are arranged is arranged between a row on which the third pixel is arranged and a row on which the fourth pixel is arranged.

15. The photoelectric conversion device according to claim 14, wherein the pixel control circuit performs an operation of simultaneously reading out a pixel signal of the first pixel, a pixel signal of the second pixel, a pixel signal of the third pixel, and a pixel signal of the fourth pixel.

16. A method of driving a photoelectric conversion device including a pixel region in which a plurality of pixels each including a photoelectric converter are arranged to form a plurality of rows and a plurality of columns, wherein the pixel region includes a first readout region, a second readout region, a third readout region, and a fourth readout region, wherein a first pixel in the first readout region and a second pixel in the second readout region are arranged on a first row and on different columns, wherein a third pixel in the third readout region and a fourth pixel in the fourth readout region are arranged on a first column and on different rows, and wherein the first row on which the first pixel and the second pixel are arranged is arranged between a row on which the third pixel is arranged and a row on which the fourth pixel is arranged, the method comprising:

simultaneously reading out a pixel signal of the first pixel and a pixel signal of the second pixel in a first period; and simultaneously reading out a pixel signal of the third pixel and a pixel signal of the fourth pixel in a second period that is different from the first period.

17. The method of driving the photoelectric conversion device according to claim 16, wherein the photoelectric conversion device further including a plurality of first control lines each connected to the pixels on a corresponding row such that at least any one of the plurality of first control lines is arranged on each of the plurality of rows and a plurality of first output lines each arranged on each of the plurality of columns and configured to output signals from the pixels on a corresponding column, the method further comprising:

driving the first pixel and the second pixel by a control signal supplied via corresponding one of the first control lines and simultaneously reading out a pixel signal of the first pixel and a pixel signal of the second pixel to the plurality of first output lines on corresponding columns.

18. The method of driving the photoelectric conversion device according to claim 17, wherein the photoelectric conversion device further including a plurality of second control lines each connected to the pixels on a corresponding column such that at least any one of the plurality of second control lines is arranged on each of the plurality of columns and a plurality of second output lines each arranged on each of the plurality of rows and configured to output signals from the pixels on a corresponding row, the method further comprising:

driving the third pixel and the fourth pixel by a control signal supplied via corresponding one of the second control lines and simultaneously reading out a pixel signal of the third pixel and a pixel signal of the fourth pixel to the plurality of second output lines on corresponding rows.

19. The method of driving the photoelectric conversion device according to claim 17, wherein the photoelectric conversion device further including a plurality of second control lines each connected to the pixels on a corresponding row such that at least any one of the plurality of second control lines is arranged on each of the plurality of rows and a plurality of second output lines each arranged on each of the plurality of columns and configured to output signals from the pixels on a corresponding column, the method further comprising:

driving the third pixel and the fourth pixel by control signals supplied via the plurality of second control lines on corresponding rows and simultaneously reading out a pixel signal of the third pixel to corresponding one of the plurality of first output lines on a corresponding column and a pixel signal of the fourth pixel to corresponding one of the plurality of second output lines on a corresponding column.

* * * * *